(12) United States Patent
Waseen et al.

(10) Patent No.: US 9,981,529 B2
(45) Date of Patent: May 29, 2018

(54) ACTUATOR HAVING A TEST MODE

(75) Inventors: Daniel Waseen, Minneapolis, MN (US); Bruce S. Johnson, Excelsior, MN (US); Larry Weber, New Brighton, MN (US); Paul Wacker, Plymouth, MN (US)

(73) Assignee: Honeywell International Inc., Morris Plains, NJ (US)

( * ) Notice: Subject to any disclaimer, the term of this patent is extended or adjusted under 35 U.S.C. 154(b) by 1519 days.

(21) Appl. No.: 13/278,694

(22) Filed: Oct. 21, 2011

(65) Prior Publication Data
US 2013/0103324 A1 Apr. 25, 2013

(51) Int. Cl.
*H02K 7/14* (2006.01)
*B60H 1/00* (2006.01)

(52) U.S. Cl.
CPC ..... *B60H 1/00857* (2013.01); *B60H 1/00964* (2013.01); *B60Y 2304/09* (2013.01)

(58) Field of Classification Search
USPC .................. 318/3, 7, 8, 131, 756, 295, 498
See application file for complete search history.

(56) References Cited

U.S. PATENT DOCUMENTS

| | | |
|---|---|---|
| 3,767,985 A | 10/1973 | King |
| 3,829,848 A | 8/1974 | Eickelberg et al. |
| 4,129,847 A | 12/1978 | Teichert |
| 4,302,931 A | 12/1981 | White et al. |
| 4,549,446 A | 10/1985 | Beeson |
| 4,628,268 A | 12/1986 | Matsubara |
| 4,652,417 A | 3/1987 | Sutherland et al. |
| 4,673,920 A | 6/1987 | Ferguson et al. |
| 4,688,183 A | 8/1987 | Carll et al. |

(Continued)

FOREIGN PATENT DOCUMENTS

| | | |
|---|---|---|
| DE | 202004011803 | 12/2004 |
| EP | 0511828 | 11/1992 |

(Continued)

OTHER PUBLICATIONS

"555 Timer IC," Wikipedia, the Free Encyclopedia, 9 pages, Aug. 7, 2012.

(Continued)

*Primary Examiner* — Bentsu Ro
*Assistant Examiner* — Iftekhar Mustafa
(74) *Attorney, Agent, or Firm* — Seager, Tufte & Wickhem, LLP

(57) ABSTRACT

An actuator system which may incorporate a motor, a motor controller connected to the motor, a processor connected to the motor controller, and a switch connected to the processor for engaging the motor to open and close an actuator shaft. The switch may have a position which is a test mode. Selecting the position of test mode may cause the motor to move the actuator shaft to a certain position to verify operation of the actuator shaft. The actuator shaft may stay in the certain position while the switch is in a position of test mode. The system may also incorporate a spring attached to the actuator shaft. If power fails to the motor, then the actuator spring or another mechanism may return the actuator shaft to a fail safe position. The test mode may alternatively be selected at a controller via the communications bus to the processor.

15 Claims, 27 Drawing Sheets

(56) References Cited

U.S. PATENT DOCUMENTS

| | | |
|---|---|---|
| 4,742,475 A | 5/1988 | Kaiser et al. |
| 4,794,314 A | 12/1988 | Janu et al. |
| 4,837,731 A | 6/1989 | Levine et al. |
| 4,854,852 A | 8/1989 | Patton et al. |
| 4,878,001 A | 10/1989 | Hagikura et al. |
| 4,919,328 A | 4/1990 | Hara et al. |
| 4,922,171 A | 5/1990 | Ohi |
| 5,025,206 A | 6/1991 | Germer et al. |
| 5,080,140 A | 1/1992 | Ostrand et al. |
| 5,081,405 A | 1/1992 | Nelson |
| 5,123,875 A | 6/1992 | Eubank et al. |
| 5,153,493 A | 10/1992 | Jornod et al. |
| 5,159,534 A | 10/1992 | Hudson et al. |
| 5,180,959 A | 1/1993 | Christopher |
| 5,318,516 A | 6/1994 | Cosmescu |
| 5,416,781 A | 5/1995 | Ruiz |
| 5,422,553 A | 6/1995 | MacLennan et al. |
| 5,431,182 A | 7/1995 | Brown |
| 5,446,677 A | 8/1995 | Jensen et al. |
| 5,454,273 A | 10/1995 | Smith |
| 5,465,031 A | 11/1995 | Nilssen |
| 5,584,319 A | 12/1996 | Cholin |
| 5,621,398 A | 4/1997 | Blair et al. |
| 5,682,329 A | 10/1997 | Seem et al. |
| 5,711,480 A | 1/1998 | Zepke et al. |
| 5,744,923 A | 4/1998 | Strauss et al. |
| 5,836,814 A | 11/1998 | Cunningham, Jr. |
| 5,848,609 A | 12/1998 | Marchessault et al. |
| 5,938,524 A | 8/1999 | Cunningham, Jr. |
| 6,015,142 A | 1/2000 | Ulicny |
| 6,021,955 A | 2/2000 | Pasch et al. |
| 6,025,788 A | 2/2000 | Diduck |
| 6,035,878 A | 3/2000 | Adams et al. |
| 6,051,948 A | 4/2000 | Vepy |
| 6,059,046 A | 5/2000 | Lowry |
| 6,099,405 A | 8/2000 | Cunningham, Jr. |
| 6,178,997 B1 | 1/2001 | Adams et al. |
| 6,198,243 B1 | 3/2001 | Ritmanich et al. |
| 6,249,100 B1 | 6/2001 | Lange |
| RE37,589 E | 3/2002 | Mueller |
| 6,431,203 B1 | 8/2002 | Zhu et al. |
| 6,431,231 B1 | 8/2002 | Zhu et al. |
| 6,443,422 B1 | 9/2002 | Gluf, Jr. |
| 6,514,138 B2 | 2/2003 | Estepp |
| 6,629,886 B1 | 10/2003 | Estepp |
| 6,651,952 B1 | 11/2003 | Hightower et al. |
| 6,725,976 B2 | 4/2004 | Oh et al. |
| 6,838,988 B2 | 1/2005 | Lennartz et al. |
| 6,851,620 B2 | 2/2005 | Hill |
| 6,915,171 B2 | 7/2005 | Mayer |
| 6,922,123 B2 | 7/2005 | Lalonde et al. |
| 6,954,044 B2 | 10/2005 | McMillan et al. |
| 6,979,965 B2 | 12/2005 | McMillan et al. |
| 7,021,072 B2 | 4/2006 | McMillan et al. |
| 7,024,856 B2 | 4/2006 | Ando et al. |
| 7,031,880 B1 | 4/2006 | Seem et al. |
| 7,033,268 B2 | 4/2006 | Caliendo et al. |
| 7,050,885 B2 | 5/2006 | Fiegle et al. |
| 7,058,542 B2 | 6/2006 | Hauhia et al. |
| 7,066,273 B2 | 6/2006 | Tan |
| 7,079,831 B2 | 7/2006 | Schwartzman et al. |
| 7,105,949 B2 | 9/2006 | Wang et al. |
| 7,188,481 B2 | 3/2007 | DeYoe et al. |
| 7,241,218 B2 | 7/2007 | Van Becelaere et al. |
| 7,258,280 B2 | 8/2007 | Wolfson |
| 7,265,512 B2 | 9/2007 | McMillan et al. |
| 7,378,980 B2 | 5/2008 | McFarland |
| 7,401,541 B2 | 7/2008 | McCarroll et al. |
| 7,431,568 B2 | 10/2008 | Brown et al. |
| 7,442,068 B2 | 10/2008 | Hammer et al. |
| 7,446,494 B2 | 11/2008 | Grabinger et al. |
| 7,451,759 B2 | 11/2008 | Weiss et al. |
| 7,460,013 B1 | 12/2008 | Osborne et al. |
| 7,476,988 B2 | 1/2009 | Mulhouse et al. |
| 7,477,028 B2 | 1/2009 | Bokusky et al. |
| 7,492,233 B2 | 2/2009 | Grabinger |
| 7,525,266 B2 | 4/2009 | Bolusky et al. |
| 7,533,635 B2 | 5/2009 | Bradley et al. |
| 7,557,549 B2 | 7/2009 | Underhill |
| 7,586,279 B2 | 9/2009 | Theunissen et al. |
| 7,622,828 B2 | 11/2009 | Grabinger et al. |
| 7,633,393 B2 | 12/2009 | Bonne |
| 7,636,613 B2 | 12/2009 | Borah et al. |
| 7,639,127 B2 | 12/2009 | Kastli |
| 7,653,459 B2 | 1/2010 | Pouchak et al. |
| 7,664,573 B2 | 2/2010 | Ahmed |
| 7,672,913 B2 | 3/2010 | Kaplan et al. |
| 7,697,492 B2 | 4/2010 | Petite |
| 7,774,441 B2 | 8/2010 | Frutiger et al. |
| 7,784,291 B2 | 8/2010 | Butler et al. |
| 7,787,994 B2 | 8/2010 | Wacker |
| 7,798,170 B2 | 9/2010 | Hotz et al. |
| 7,802,734 B2 | 9/2010 | Stanimirovic |
| 7,831,338 B1 | 11/2010 | Haydu |
| 7,840,311 B2 | 11/2010 | Grohman |
| 7,852,627 B2 | 12/2010 | Schmitt et al. |
| 7,852,765 B2 | 12/2010 | Neuman et al. |
| 7,859,207 B2 | 12/2010 | Yamada et al. |
| 7,876,217 B2 | 1/2011 | Laackmann et al. |
| 7,891,241 B2 | 2/2011 | McSheffrey et al. |
| 7,922,149 B2 | 4/2011 | Anderson et al. |
| 7,944,672 B1 | 5/2011 | Chiang |
| 7,966,438 B2 | 6/2011 | Punyko et al. |
| 8,031,650 B2 | 10/2011 | Petite et al. |
| 8,043,148 B2 | 10/2011 | Eguchi et al. |
| 8,046,896 B2 | 11/2011 | Schmitt et al. |
| 8,084,980 B2 | 12/2011 | Carlson et al. |
| 8,218,547 B2 | 7/2012 | Van Steen et al. |
| 8,251,785 B2 | 8/2012 | Schmitt et al. |
| 8,345,077 B2 | 1/2013 | Hayashi |
| 8,588,983 B2 | 11/2013 | Grabinger et al. |
| 8,764,529 B2 | 7/2014 | Cook et al. |
| 8,777,341 B2 | 7/2014 | Amaral et al. |
| 8,950,461 B2 | 2/2015 | Adams et al. |
| 9,155,229 B2 | 10/2015 | Schmitt et al. |
| 9,322,569 B2 | 4/2016 | Scharf et al. |
| 2003/0052180 A1 | 3/2003 | Huhn et al. |
| 2003/0178257 A1 | 9/2003 | Oh et al. |
| 2004/0124797 A1 | 7/2004 | Takeuchi et al. |
| 2004/0212336 A1 | 10/2004 | McMillan et al. |
| 2005/0093685 A1* | 5/2005 | Kachouh ............ B60N 2/0244 340/438 |
| 2005/0127861 A1 | 6/2005 | McMillan et al. |
| 2006/0035580 A1 | 2/2006 | Anderson et al. |
| 2006/0130502 A1 | 6/2006 | Wruck et al. |
| 2007/0060039 A1 | 3/2007 | Cook et al. |
| 2007/0120664 A1 | 5/2007 | Bilbrey et al. |
| 2007/0226318 A1 | 9/2007 | Rydberg et al. |
| 2008/0051024 A1 | 2/2008 | Caliendo et al. |
| 2008/0156887 A1* | 7/2008 | Stanimirovic ....... F24F 11/0086 236/12.1 |
| 2008/0244104 A1 | 10/2008 | Clemente |
| 2008/0258253 A1 | 10/2008 | Fey et al. |
| 2008/0316039 A1 | 12/2008 | White et al. |
| 2009/0005917 A1 | 1/2009 | Hole |
| 2009/0033513 A1 | 2/2009 | Salsbury et al. |
| 2009/0073628 A1* | 3/2009 | Nitsche ................ H01H 47/005 361/190 |
| 2009/0082880 A1 | 3/2009 | Saunders |
| 2009/0101725 A1 | 4/2009 | Dolan et al. |
| 2009/0111373 A1 | 4/2009 | Hollender et al. |
| 2009/0181611 A1 | 7/2009 | Hollender et al. |
| 2010/0077254 A1 | 3/2010 | Erdmann et al. |
| 2010/0102973 A1 | 4/2010 | Grohman et al. |
| 2010/0106262 A1 | 4/2010 | Schreyer et al. |
| 2010/0106836 A1 | 4/2010 | Schreyer et al. |
| 2010/0109675 A1 | 5/2010 | Wong et al. |
| 2010/0121613 A1 | 5/2010 | Rosca et al. |
| 2010/0134934 A1 | 6/2010 | Matsubara et al. |
| 2010/0141243 A1 | 6/2010 | Divicino et al. |
| 2010/0198411 A1 | 8/2010 | Wolfson |
| 2010/0253270 A1 | 10/2010 | Kuster et al. |
| 2011/0070904 A1 | 3/2011 | McFarland |
| 2011/0270446 A1 | 11/2011 | Scharf et al. |

(56) References Cited

U.S. PATENT DOCUMENTS

| | | | |
|---|---|---|---|
| 2012/0091804 A1* | 4/2012 | Altonen | E06B 9/68 307/31 |
| 2012/0229064 A1 | 9/2012 | Jeung | |
| 2012/0302150 A1 | 11/2012 | Schmitt et al. | |
| 2014/0295750 A1 | 10/2014 | Anderson et al. | |
| 2015/0111489 A1 | 4/2015 | Chopra | |
| 2015/0226001 A1 | 8/2015 | Adams et al. | |

FOREIGN PATENT DOCUMENTS

| | | |
|---|---|---|
| EP | 1170036 | 1/2002 |
| EP | 1901145 | 3/2008 |
| EP | 2241834 | 10/2010 |
| GB | 1172789 | 12/1969 |
| JP | 57086544 | 5/1982 |
| JP | 60091411 | 5/1985 |
| JP | 63257802 | 10/1988 |
| JP | 1215633 | 8/1989 |
| JP | 2009118155 | 5/2009 |
| WO | WO 2010000077 | 1/2010 |

OTHER PUBLICATIONS

Beckhoff New Automation Technology, "Application Note DK9222-0810-0035, I/O, Building Automation," 7 pages, Aug. 2010.

Belimo, "Belimo Gateway MP to Modbus RTU-UK24MOD," Product Information, 20 pages, Feb. 2010.

Belimo, "Damper Actuator Plug-In Description/Documentation #Tools-007-E_20.11.05," 11 pages, Nov. 20, 2005.

Belimo, "MP-Bus-Interface—for Belimo Damper Actuators," 16 pages, Oct. 2009.

Belimo, "Perfect for Each and Every Connection, Bus Integration of Actuators and Sensors in Heating, Ventilation, and Air Conditioning Systems," 10 pages, prior to Sep. 30, 2011.

Belimo, "Ring Bus Solution by Belimo, State of the Art System for Bus Integrated Fire Protection and Smoke Control," 6 pages, prior to Sep. 30, 2011.

U.S. Appl. No. 13/250,889, filed Sep. 30, 2011.
U.S. Appl. No. 13/291,928, filed Nov. 8, 2011.
U.S. Appl. No. 13/293,029, filed Nov. 9, 2011.
U.S. Appl. No. 13/293,041, filed Nov. 9, 2011.
U.S. Appl. No. 13/293,051, filed Nov. 9, 2011.

Delta Controls, "HVAC Application Controllers DVC-V322," Document Edition 2.0, 7 pages, Feb. 2005.

Distech Controls, "ECC-VAV/ECC-VVT easyCONTROLS LonMark Certified Application Specific Single Duct Variable Air Volume/Variable Volume Temperature Controllers," 5 pages, prior to Sep. 30, 2011.

Echelon, "LNS Plug-In Belimo," 1 page, 2011.

Honeywell, "3 Nm, 5 Nm Series Spring Return Direct Coupled Actuators, MS3103, MS3105, MS4103, MS4105, MS7403, MS7405, MS7503, MS7505, MS8103, MS8105," Installation Instructions, 12 pages, 2011.

Honeywell, "Advanced Control from a Unitary Controller," 8 pages, Mar. 2009.

Honeywell, "Jade Economizer Module (Model W7220)," Installation Instructions, 20 pages, 2010.

Honeywell, "ML4202, ML4302, ML4702, ML4802, ML8202, ML8302 Fast-Acting, Two-Position Actuators for Fire/Smoke Control Applications," Installation Instructions, 4 pages, 2005.

Honeywell, "SO5, S10, S20 Series Spring Return Direct Coupled Actuators, MS4105, MS4110, MS4120, MS71XX, MS7505, MS7510, MS7520, MS8105, MS8110, MS8120," Product Data, 16 pages, 2008.

Johnson Controls Unitary Products, "YCCS Zone Bypass Damper Assembly," 6 pages, 2008.

Microchip Technology, Inc., "Using PWM to Generate Analog Output AN538," 2 pages, 1997.

Motorola, "Triacs Silicon Bidirectional Triode Thyristors," 2 pages, prior to Sep. 30, 2011.

MP-Bus Technology by Belimo, "MP-Bus Convenient and Secure Integration of Belimo Actuator Drives," 1 page, prior to Sep. 30, 2011.

Noliac, "Noliac Acquires Piezo Actuator Drive Technology from Siemens," 2 pages, prior to Sep. 30, 2011.

On Semiconductor, "AND8054/D Designing RC Oscillator Circuits with Low Voltage Operational Amplifiers and Comparators for Precision Sensor Applications," 3 pages, Jul. 2001.

Siemens, "BACnet ATEC," Technical Specification Sheet Document No. 149-825, 4 pages, Apr. 9, 2010.

Siemens, "Siemens, BACnet VAV Actuator," Technical Specification Sheet Rev. AA, 5 pages, Jan. 2008.

Tridium, "Belimo and Tridium to Jointly Develop a Next Generation VAV Controller with Wireless Communications," 2 pages, May 15, 2008.

Wang et al., "Research on Reliability of a Hybrid Three-Redundant Electro-Mechanical Actuator," Proceedings of the 2009 IEEE International Conference on Mechatronics and Automation, Aug. 9-12, 2009.

Honeywell, "Spyder Sylk Enhanced, Advanced Control From a Unitary Controller," 8 pages, Mar. 2009.

Honeywell, "Spyder Sylk Enhanced," 11 pages, Oct. 2008.

ControlTrends Article Entitled, "Honeywell Zelix Actuators," 1 page, published on the internet Nov. 11, 2009.

Ruff, "Servo Motor Control Application on a Local Interconnection Network (LIN)," Rev. 1.0, Dec. 2005.

Siemens, "OpenAir—Robust Damper Actuators for Energy-Efficient Ventilation, Durable Actuators for HVAC Applications, Air Volume Controllers as well as Fire and Smoke Protection Dampers," 10 pages, 2011.

* cited by examiner

ACTUATOR HAVING A TEST MODE

BACKGROUND

The present disclosure pertains to control devices and particularly to mechanical movers of devices. More particularly, the disclosure pertains of actuators.

SUMMARY

The disclosure reveals an actuator system which may incorporate a motor, a motor controller connected to the motor, a processor connected to the motor controller, and a switch connected to the processor for engaging the motor to open and close an actuator shaft. The switch may have a position which is a test mode. Selecting the position of test mode may cause the motor to move the actuator shaft to a certain position to verify operation of the actuator shaft. The actuator shaft may stay in the certain position while the switch is in a position of test mode. The system may also incorporate a spring attached to the actuator shaft. If power fails to the motor, then the actuator spring or another mechanism may return the actuator shaft to a fail safe position. The test mode may alternatively be selected at a controller via the communications bus to the processor.

DESCRIPTION

Coupled actuators may be used within heating, ventilating and air-conditioning (HVAC) systems. They may drive final control elements. Example applications may incorporate volume control dampers, mounted directly to the drive shaft of the actuator or remotely with the use of accessory hardware, rotary valves such as ball or butterfly valves mounted directly to the actuator drive shaft, and linear stroke or cage valves mounted with linkages to provide linear actuation. The actuator may also be used to operate ventilation flaps, louvers and other devices. The actuator may be a spring return device designed for clockwise or counter-clockwise fail-safe operation with a continuously engaged mechanical spring. The spring may return the actuator or the mechanism that the actuator is operating to a fail-safe position within a certain time of power loss. An example of the certain time may be 25 seconds. The actuator may be mounted to provide clockwise or counterclockwise spring return by flipping or turning the unit over. The stroke of the actuator may be adjusted for an application at hand. An auxiliary knob may be used to control minimum position or switch position. For switch position, a degree of rotation may be selected for where the switch is desired to activate. The actuator may have an override of the control signal for certain applications such as for example freeze protection. The override may move the actuator to a full open or full closed position. One instance of position change is that the actuator may be designed to respond to direct digital control (DDC) instantaneous contact closures.

Figure 1:
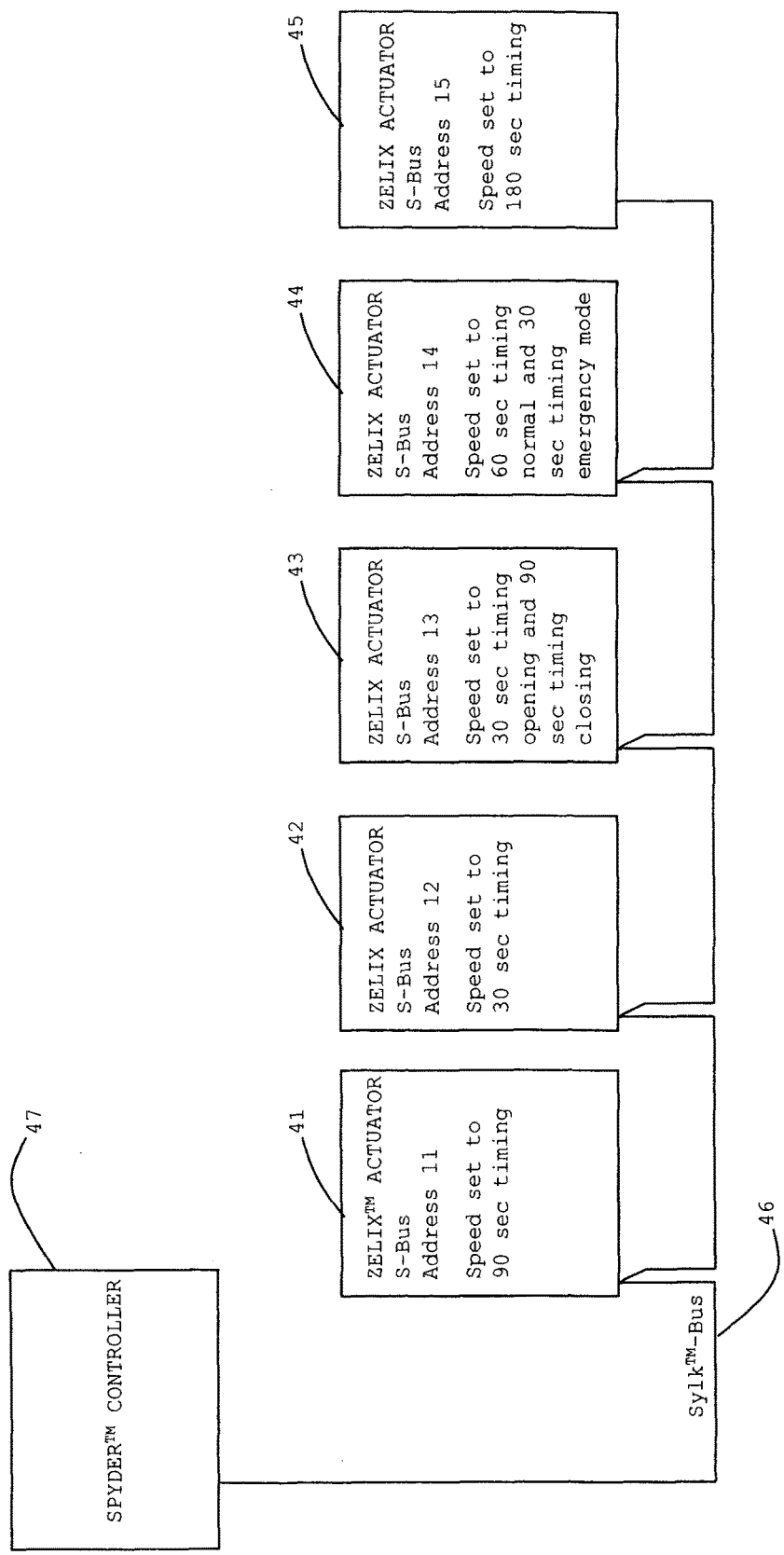
FIG. 1 is a diagram of an example layout of actuators and a controller connected to a common bus.

FIG. 1 is a diagram of an example layout of actuators 41, 42, 43, 44 and 45 connected to a common bus 46. Bus 46 may be connected to a controller 47. Controller 47 may be Spyder controller. Bus 46 may be a Sylk bus. The actuators may be Zelix actuators. Each actuator may have its open and close speeds individually set by controller 47 via signals on bus 46. For examples of various settings, actuator 41 may have a speed set to a 90 second timing, actuator 42 a speed set to a 30 second timing; actuator 43 a speed set to a 30 second timing for opening and a 90 second timing for closing, actuator 44 a speed set to a 60 second timing for a normal mode and a 30 second timing for an emergency mode, and actuator 45 a speed set for a 180 second timing. The speeds each of the actuators may be set to different timings. When a speed of an individual actuator is set by controller 47, the respective actuator may be selected according to its address. Fir instance, actuators 41, 42, 43, 44 and 45 may have addresses 11, 12, 13, 14 and 15, respectively.

Figure 2:
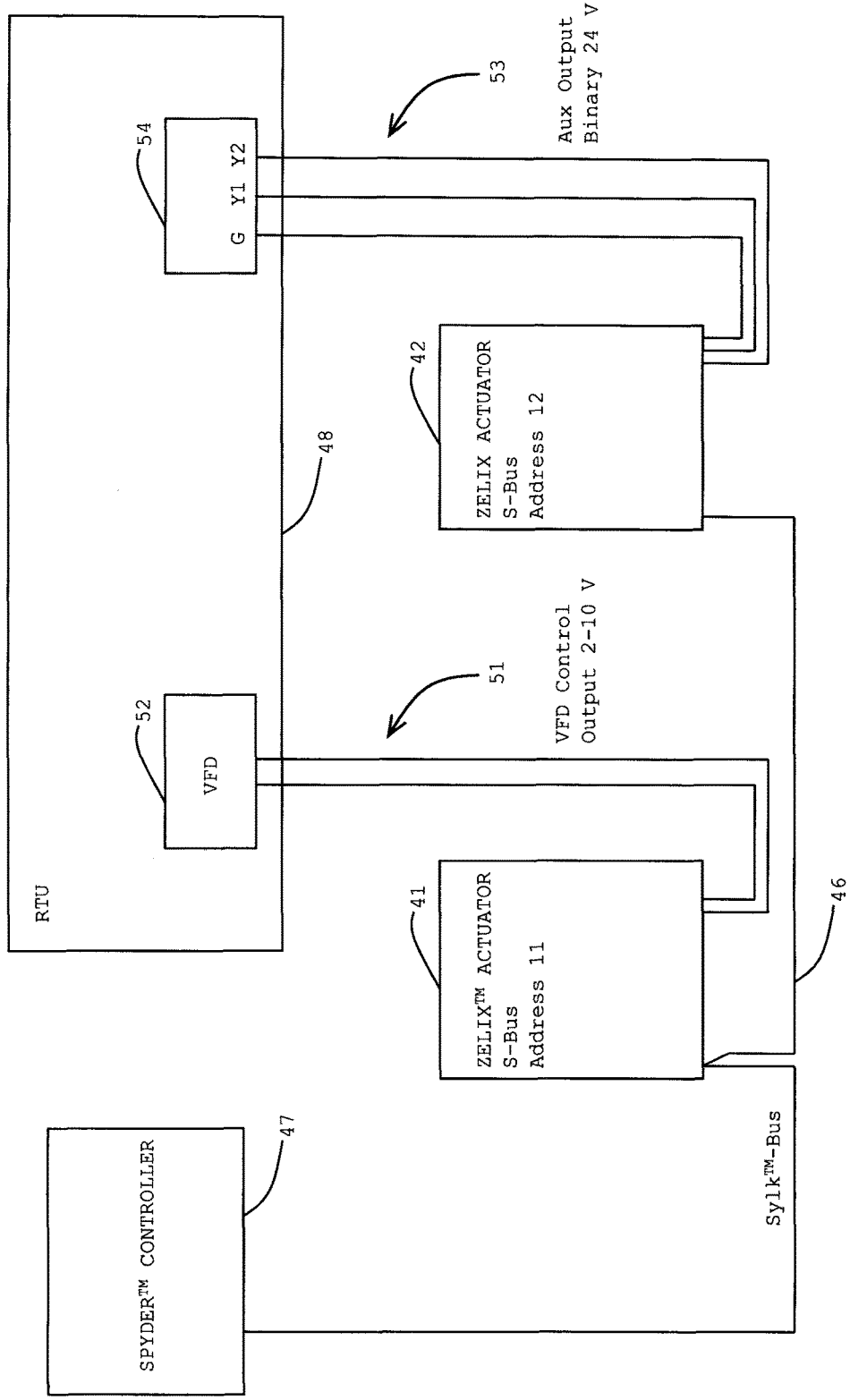
FIG. 2 is a diagram of actuators connected to a controller via a bus and to a roof top unit.

FIG. 2 is a diagram of actuators 41 and 42 connected to controller 47 via bus 46. Actuators 41 and 42 may have connections to a roof top unit (RTU) 48. Actuator 41 may have a variable frequency drive control output of 2 to 10 volts along lines 51 to a component 53 at RTU 48. Actuator 42 may have an auxiliary output binary 24 volts along lines to a component 54 of RTU 48.

A present actuator with an auxiliary output may be adjustable via network communications. Auxiliary (aux) switches on actuators in some of the related art may have their setpoints established locally on the actuator. Setting an auxiliary switch setpoint may be rather difficult because of an actuator location (e.g., in a ceiling or behind equipment) and in general auxiliary switch setpoint user interfaces may be difficult to set and see (e.g., cam systems, rotating assemblies and adjustable detents) which could lead to setpoint inaccuracies. Also, there may be a fixed hysteresis with each of these solutions.

An additional problem with some of the solutions in the related art is that they are not necessarily adjustable as a relevant application changes. For example, an aux switch may be set to make or break at around 45 degrees of the actuator's stroke. If set for 45 degrees, the aux switch may virtually always trip at that position and can not necessarily be changed without a service technician physically changing the setpoint. Some applications would benefit by having the aux switch make at 20 degrees while opening, and break at 60 degrees while closing, or 20 degrees during a heat mode and 45 degrees during a cool mode, or vice versa.

Also, some of the aux switches of the related art may only be able to change state based on an actuator shaft position. There may be many applications where switching the aux switch based on temperature or some other variable (or combination of variables) would be beneficial.

The present approach may solve the issues by allowing the auxiliary switch setpoint and control parameters to be configured remotely over the bus in real time. This approach may be implemented with digital or analog outputs and there could be a multiple setpoint per relay solution.

The present approach may be effected by enhancing the software in the controller and communicating actuator systems. It may be used by allowing the auxiliary switch parameters to be programmable via a higher order controller. An example may incorporate using a Jade controller or Spyder™ controller with Niagara™ (or Fishsim™) to program the functionality of a Sylk™ Zelix™ communicating actuator over a Sylk bus. A Sylk bus may be a two-wire, polarity insensitive bus that may provide communications between a Sylk-enabled actuator and a Sylk-enabled controller. An example of the Sylk bus circuitry may be disclosed in U.S. Pat. No. 7,966,438, issued Jun. 21, 2011, and entitled "Two-wire Communications Bus System". U.S. Pat. No. 7,966,438, issued Jun. 21, 2011, is hereby incorporated by reference.

Figure 3:
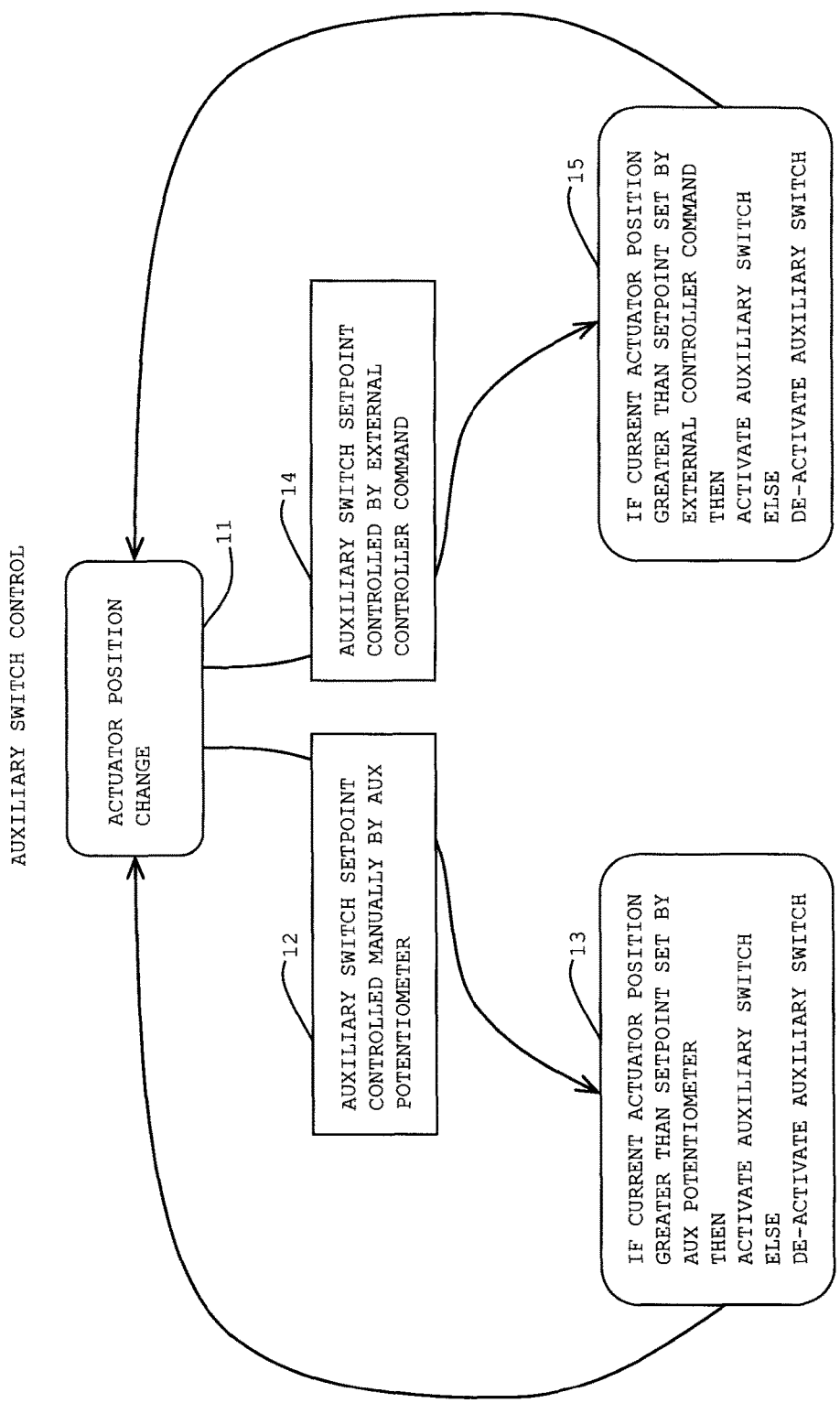
FIG. 3 is a diagram of an auxiliary switch setpoint control approach.

FIG. 3 is a diagram of an auxiliary switch control approach. Symbol 11 may indicate an auxiliary position change which may be initiated. An auxiliary switch setpoint may be controlled manually by an auxiliary potentiometer in symbol 12. Symbol 13 indicates that if the current actuator position is greater than the setpoint set by the auxiliary potentiometer, then the auxiliary switch may be activated. If not, then the auxiliary switch may be deactivated. Alternatively, in symbol 14, the auxiliary switch setpoint may be controlled by an external controller command. Symbol 15 indicates that if the current actuator position is greater than the setpoint set by an external controller command, then the auxiliary switch may be activated. If not, then the auxiliary switch may be deactivated.

A present communicating actuator may have a network adjustable running time. Applications in the field may require or benefit from different running time actuators. In the related art, different running time actuators might be purchased by model number, or programmable actuators may be programmed at commissioning using an independent tool. This situation may dictate that a person pick one running time for the actuator and application at the beginning of an implementation of the actuator.

An example of an issue of running time may occur during system checkout in an OEM factory or in the field. An OEM or field technician may prefer a fast running time (10 seconds) so that the actuator system can be checked out quickly without having to wait for a 90 second actuator to run its time.

The present approach may incorporate an actuator that allows programmable running time via the local bus. Over the bus, the actuator's running time may be programmed to different values at different times during the actuator's lifecycle. For example, the actuator may be programmed for 15 second timing during a test, 30 second timing during a normal application mode, and 90 second timing during a saver mode.

The present actuator approach may be applied in a Jade™ economizer/Sylk Zelix system implementation. The Sylk bus hardware may be implemented on the controller and the actuator. Then the firmware in these products may be created to implement the adjustable running time functionality.

Figure 4:
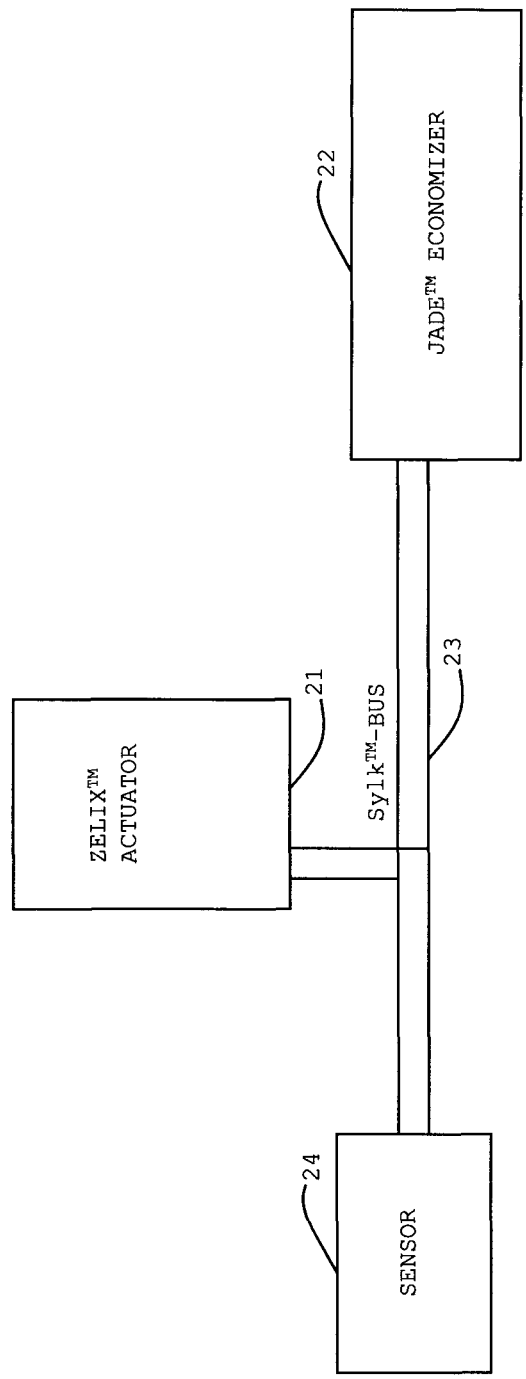
FIG. 4 is a diagram of an actuator, an economizer and sensor connected to one another via a bus.

FIG. 4 is a diagram of a Zelix actuator 21 with Jade economizer 22 connected to the actuator via a Sylk bus 23. A sensor 24 may be connected into the Sylk bus.

A present approach may incorporate a potentiometer address selection for an actuator. Setting a network address on a communicating actuator may be rather difficult. The actuator may be typically located in a hard to reach area (e.g., in a ceiling or behind equipment). Related art approaches may involve actuators that are typically small and hard to see and actuate (e.g., with dip switches/rotary encoders) and may use binary techniques as described herein which may require multiple microcontroller input pins.

The present approach may solve the issue by using a potentiometer to set and establish a network address on a communication actuator. The approach may allow for an address selector to be accessible from both sides of the actuator using a single potentiometer, the numbers and interface to be large and easy to read, and it may allow the address to be selected using only one analog input on the microcontroller.

Figure 5:
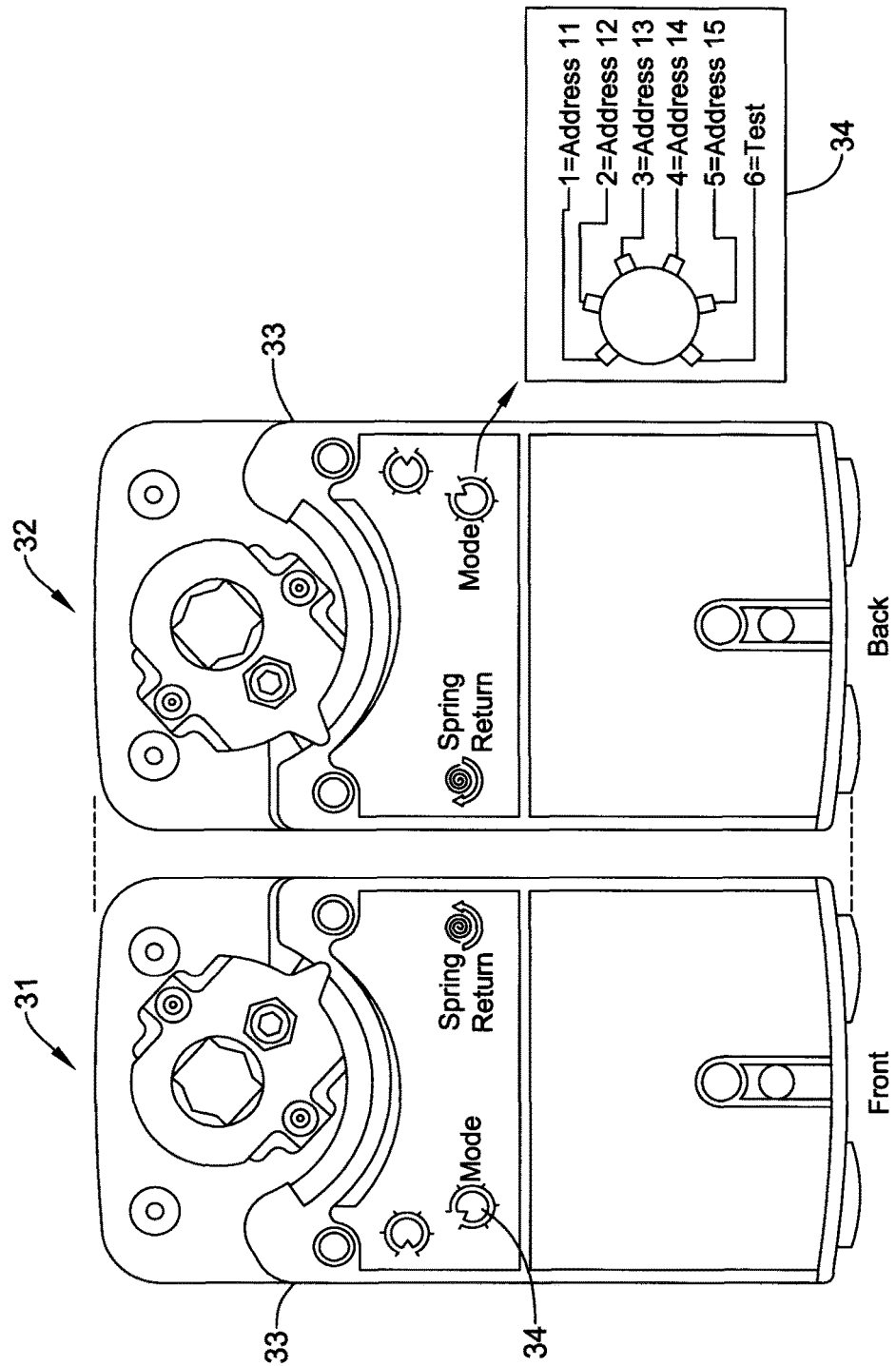
FIG. 5 is a diagram of front and back sides of an actuator revealing certain knobs for control and adjustment such as an address selector being accessible from both sides.

FIG. 5 is a diagram of a front view 31 of an actuator 33 and a back view 32 of the actuator. Certain knobs for control and adjustment such as an address selector 34 may be accessible from both sides of actuator 33. Selector 34 may have five positions for address selection. For instance, a position 1 may be for selecting an address 11, position 2 for address 12, position 3 for address 13, position 4 for address 14 and position 5 for address 15. A position 6 may be for selecting a test mode.

Figure 6:
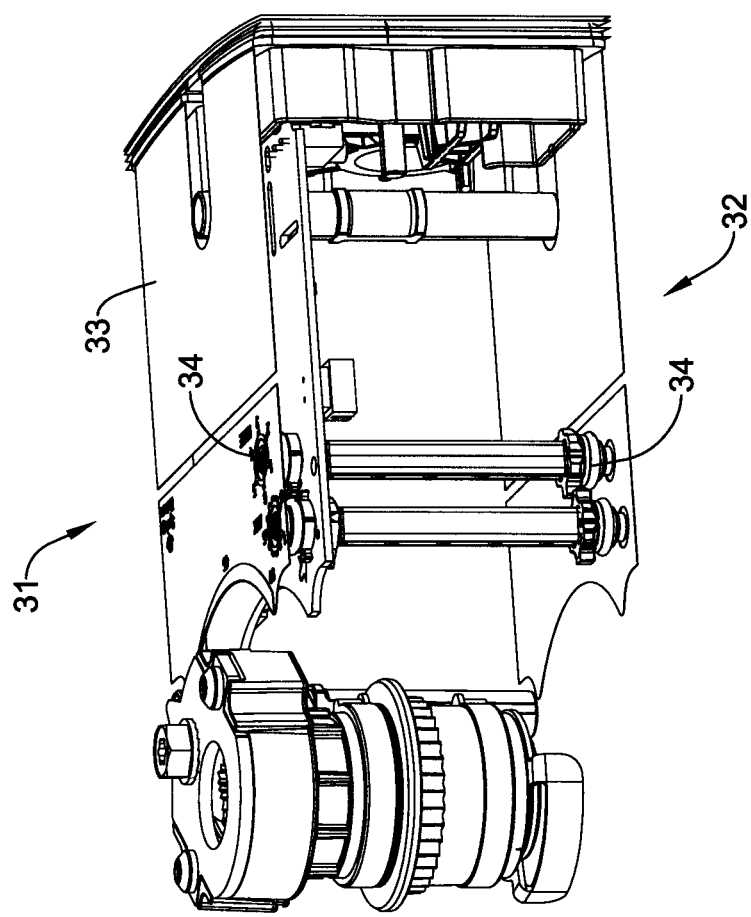
FIG. 6 is a diagram that shows perspective views of two sides of an actuator revealing the reversibility of actuator position for access to a selector from two sides of the actuator.

FIG. 6 is a diagram that shows perspective views of sides 31 and 32 of actuator 33 revealing the reversibility of the actuator for access to selector 34 from both sides of actuator 33.

The present approach may incorporate an actuator which has accessible onboard diagnostics. An issue in the related art may be that actuators in the field can fail or malfunction and of which many cases may be undetected. Such actuators may be wasting energy or giving up comfort for years before the failure is found.

The present approach may solve this issue by communicating alarms, status and diagnostics automatically over a bus. If an actuator fails, an alarm may be sent to the higher order controller for immediate notification. These software alarms and diagnostic features may be implemented in the firmware for a Sylk Zelix communicating actuator.

A controller or processor may provide on the communications bus one or more diagnostics items of a group consisting of high temperature warning, excessive noise on power line, record/report back electromotive force (EMF) on spring return, percentage of life detection, high amount of travel for given amount of time, hunting around a given point, actuator angle, communication normal indicator, stroke limiting, control valve (Cv) selection, flowrate on pressure independent control valve (PIC-V), set auxiliary switch, report auxiliary switch setting, report auxiliary switch status, report auxiliary switch current draw—auxiliary equipment status, if switch drives fan—verify fan shuts down before damper closes, if switch drives coils—verify heat exchanger running before opening/closing valve, report stuck valve/damper, PIC-V constant pressure—constant torque, changeover valve—no cycling for a period of time, time since last movement, date/time of first operation (commissioning), audible/detectable signal for location, device in warranty, device model number/serial number/date code, device type—outside air damper/standard ball valve/PIC-V valve/mixed air damper, actuator fitness/self-test routine—known system conditions, sensor—actual damper/valve position, super capacitor status, and energy consumption.

The present approach may incorporate an actuator test mode. There may be several approaches used by an actuator installer to verify that an actuator has been installed correctly. One approach may involve an operator at the control panel to cause the actuator to open and close. In another approach, the installer or maintainer may have access the connector and short the modulating input to cause the actuator to open, thus verifying that the actuator is working and connected properly.

With the test mode, there may be a test mode selection on a pot or switch that causes the actuator to move to its open position. An installer or maintainer may then just select Test Mode via the pot and verify an operation of the actuator without needing to access the connector or to communicate with a control operator.

Actuator software may verify that the test mode has been selected on the switch or potentiometer. The software may then exercise the following algorithm.

IF Test Mode THEN
Set actuator speed to maximum allowable speed
Cause actuator to open (move to end of its allowable span)
Remain in this position while in Test Mode.

Figure 7:
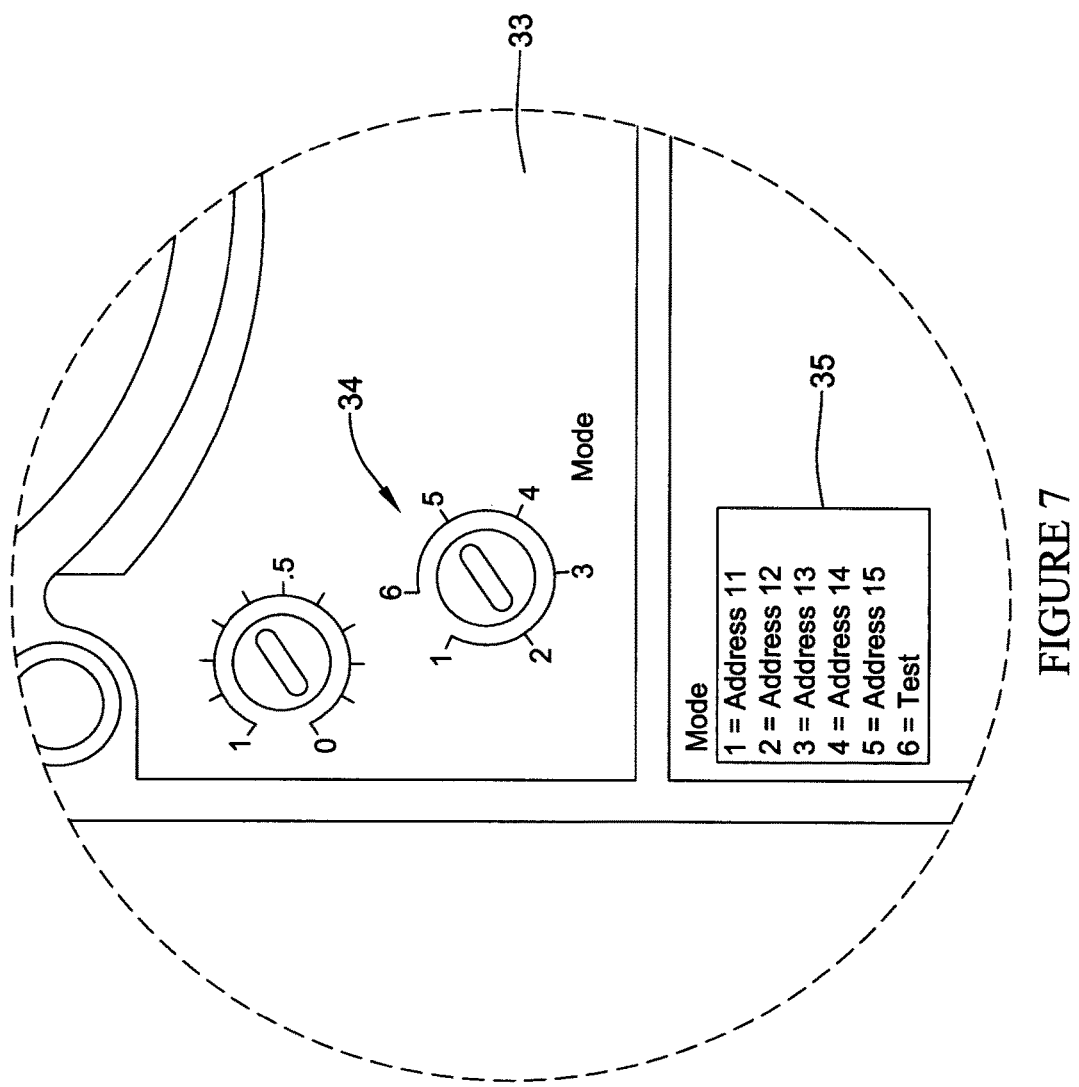
FIG. 7 is a diagram of a close view of a selector or mode switch showing positions available for a test mode and addresses of an actuator.

FIG. 7 is a diagram of a closer view of the selector or mode switch 34, showing 6 positions available for the test mode of actuator 33. A mode plate 35 indicates that position 6 may be designated for "Test" or test mode. Positions 1-5 indicate five different addresses available for selection by switch 34.

Figure 8:
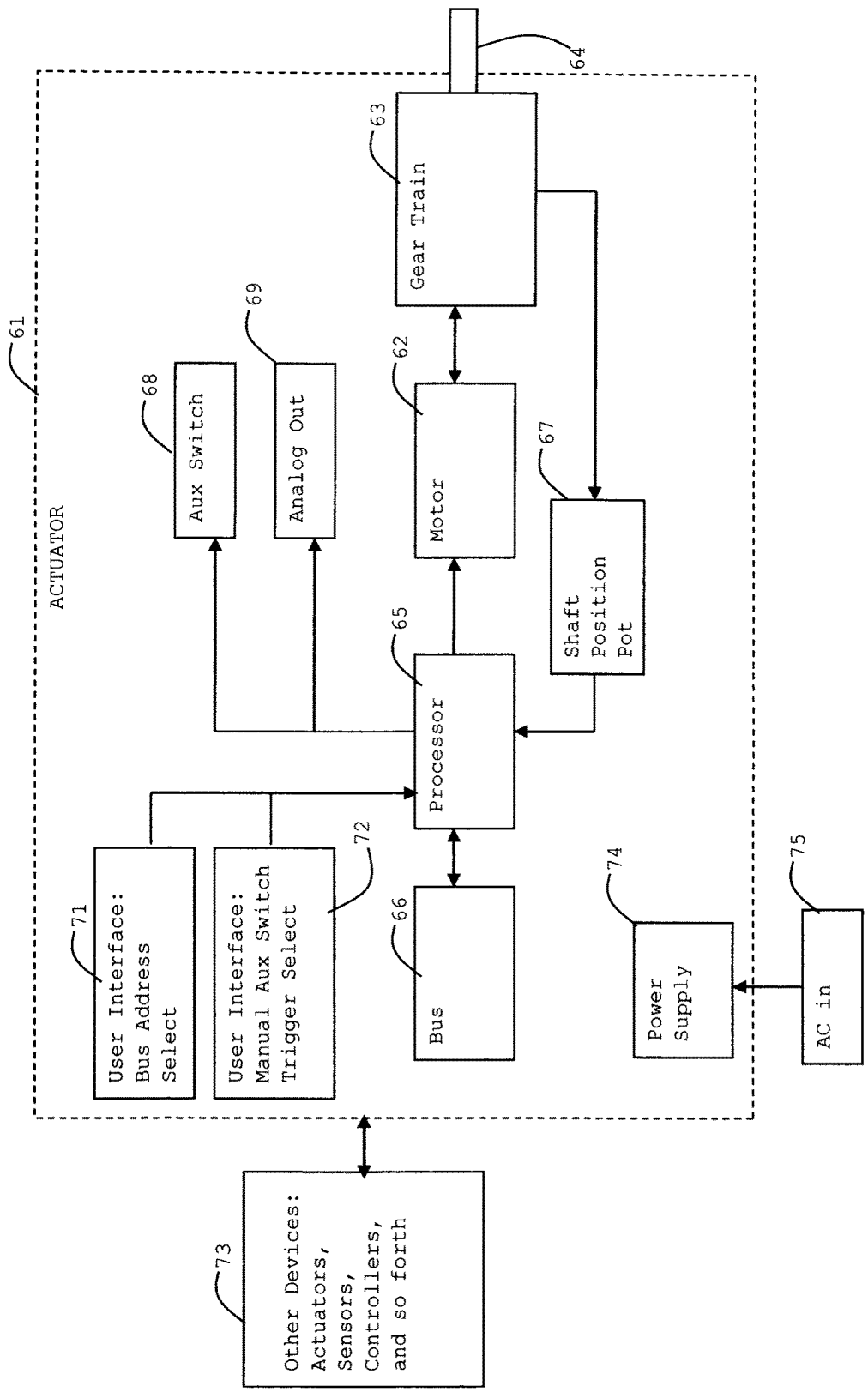
FIG. 8 is a diagram of a two-wire polarity-insensitive bus controlled actuator.

FIG. 8 is a diagram of a two-wire polarity-insensitive bus (i.e., Sylk) controlled actuator 61. An electric motor 62 may drive a gear train 63 which turn an actuator shaft 64 which may move a damper, valve, or other component. A processor 65 may be connected to motor 62 and provide control of the motor. Processor 65 may also be connected to a communications bus 66. A shaft position potentiometer 67 may be mechanically connected to the actuator shaft 64 or a part on the gear train to electrically provide a position of shaft 64 to processor 65. An auxiliary switch output 68 and an analog output 69 may be provided by processor 65. A user interface 71 may provide a bus address select to processor 65. A user interface 72 may provide a manual auxiliary switch trigger select. Actuator 61 may be connected to other devices 73 such as actuators, sensors, controllers, and so on. Actuator 61 may have a power supply 74 to power its components. An AC power line 75 or other source may provide power to supply 74.

Figure 9:
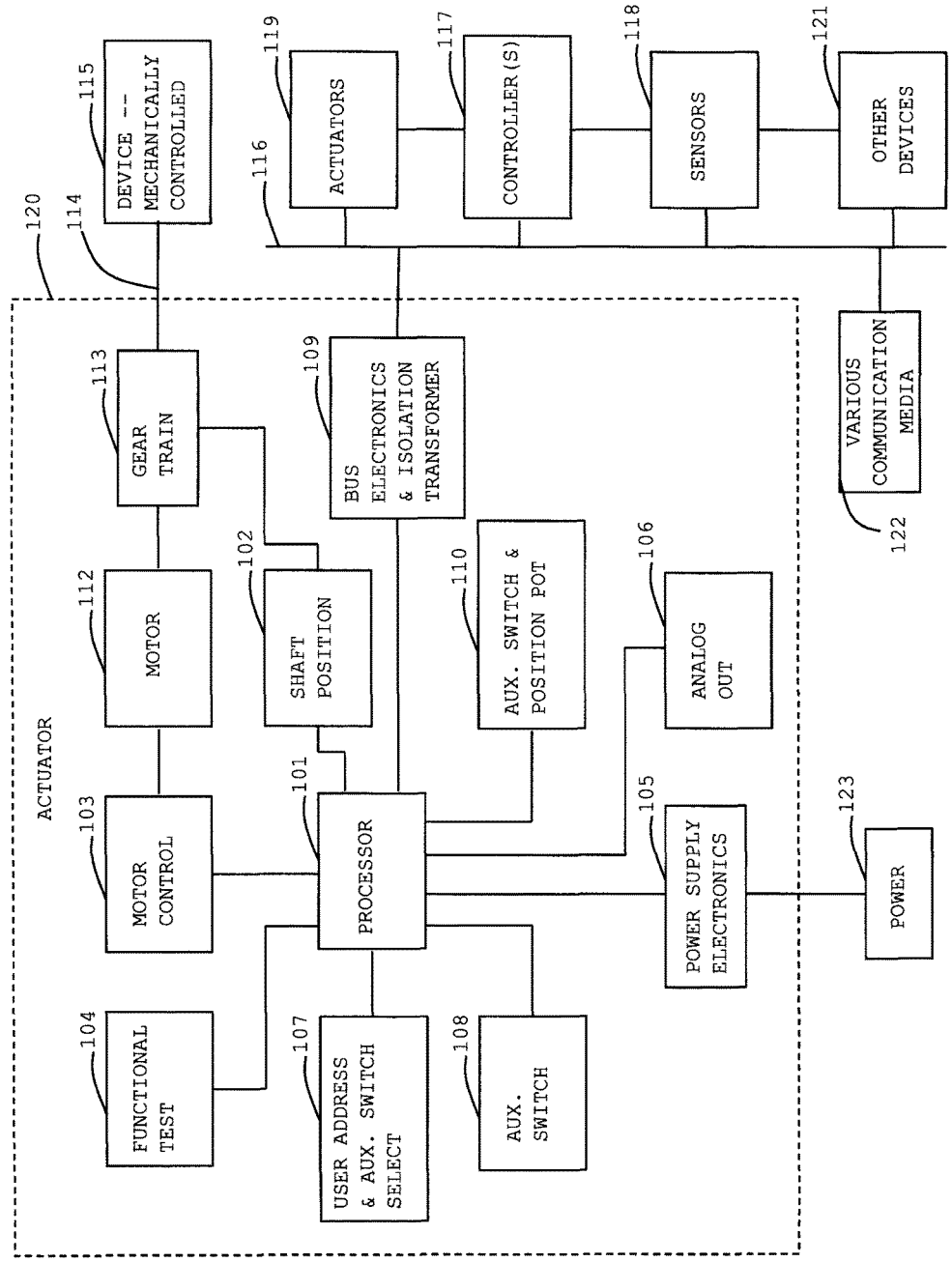
FIG. 9 is diagram of another layout of another actuator.

FIG. 9 is a diagram of an actuator 120. Many components of actuator 120 are revealed in the diagrams shown in FIGS. 10a through 10r. Interconnections of the components may be indicated in the diagrams as identified by various connections and wires having labels and alphanumeric symbols. For example, a line identified as A1 in FIG. 10a may be connected to a line identified as A1 in FIG. 10b. A processor 101 may be connected to power supply electronics 105, bus electronics and isolation transformer 109, a motor control 103 and a shaft position indicator 102. Processor 101 may also be connected to an auxiliary switch 108, an auxiliary switch and position potentiometer 110, and a user address and auxiliary switch selector 107. Further, processor 101 may be connected to an analog out 106 and functional test electronics 104.

A motor 112 may be connected to motor control 103. An output of motor 112 may be mechanically connected to a gear reduction train 113. Gear train 113 may have an actuator coupling or shaft 114 for connection to a mechanically controlled or operated device 115 such as, for example, a damper, valve, flap, louver, and so on. Gear train 113 may be connected to shaft position indicator 102.

Bus electronics and isolation transformer 109 may be connected to a communications bus 116. Outside actuator 120, bus 116 may be connected to controllers 117, sensors 118, actuators 119, and other devices 121 and various communication media 122. An outside power source 123 may be connected to power supply electronics.

Figure 10A:
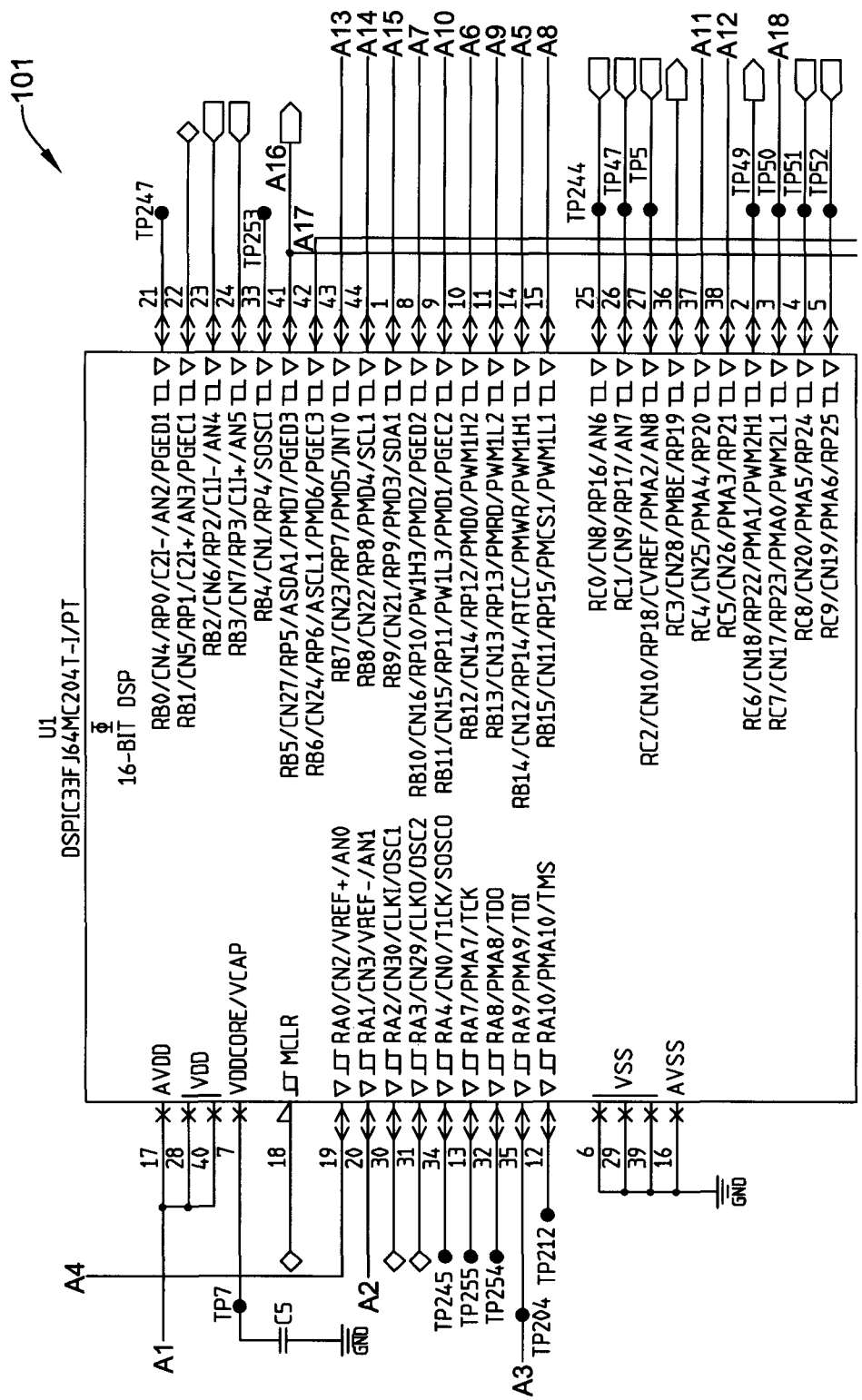
FIGS. 10a through 10r are schematics of circuitry for the actuator as represented by FIG. 9.
Figure 10B:
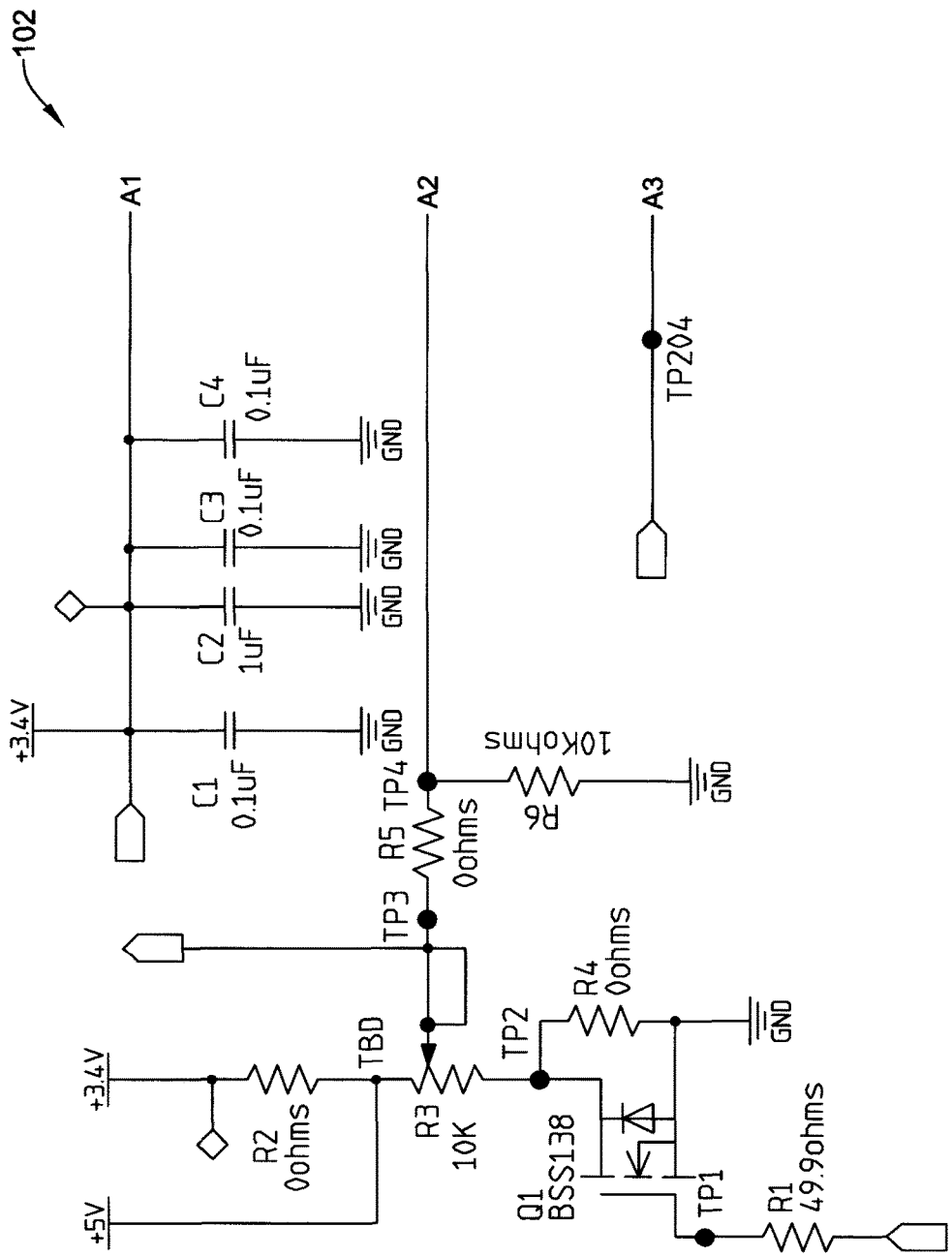
Figure 10C:
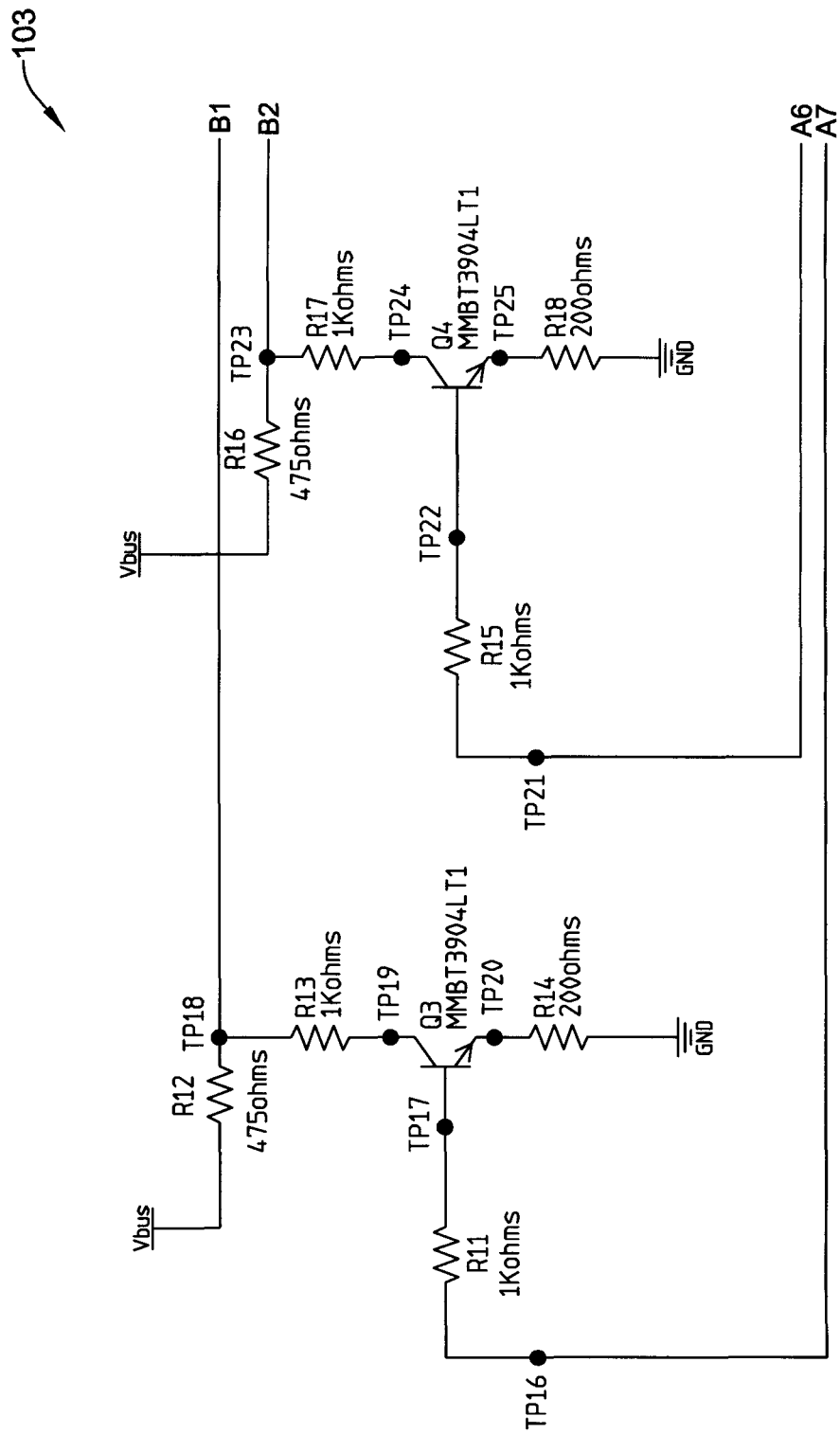
Figure 10D:
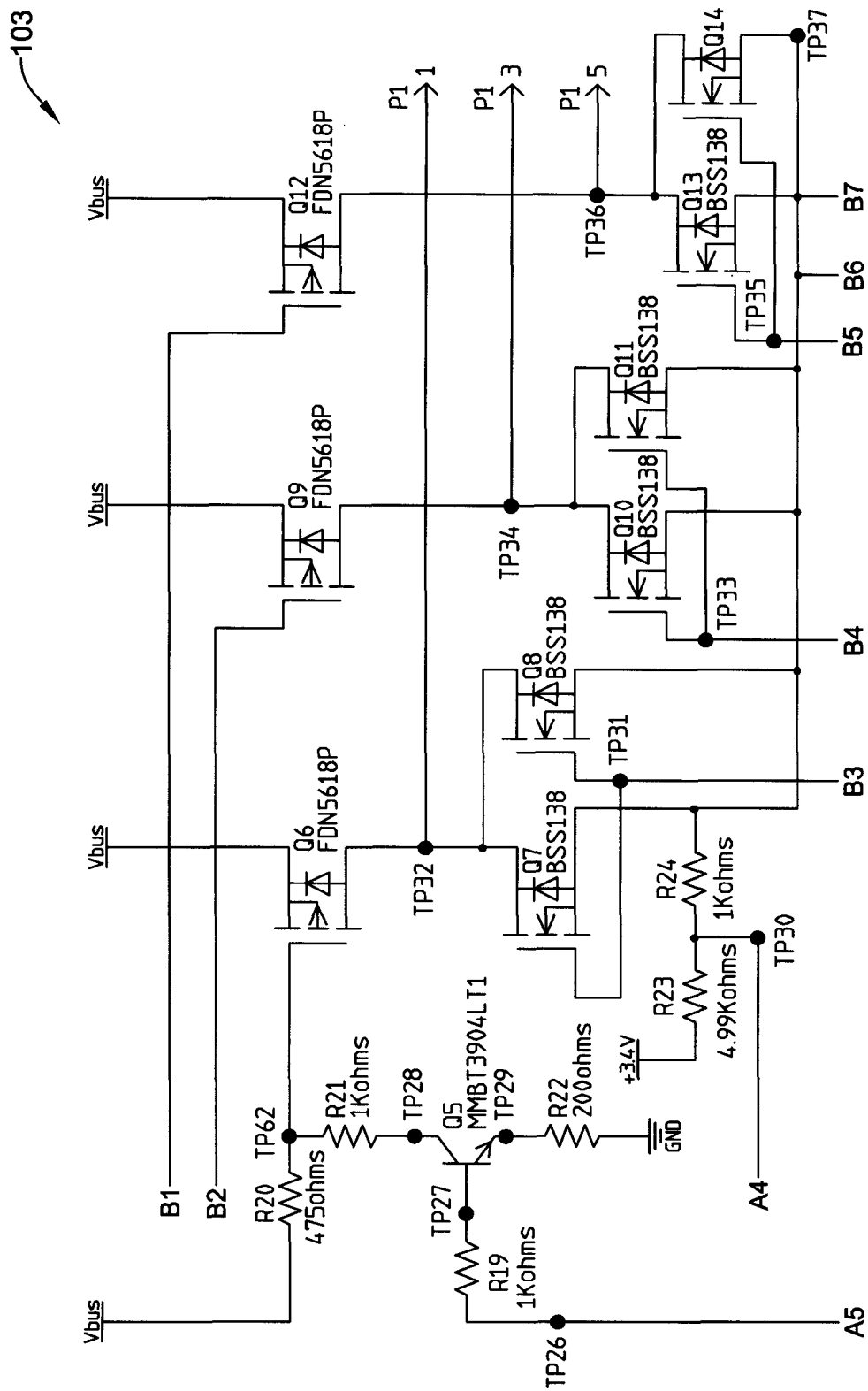
Figure 10E:
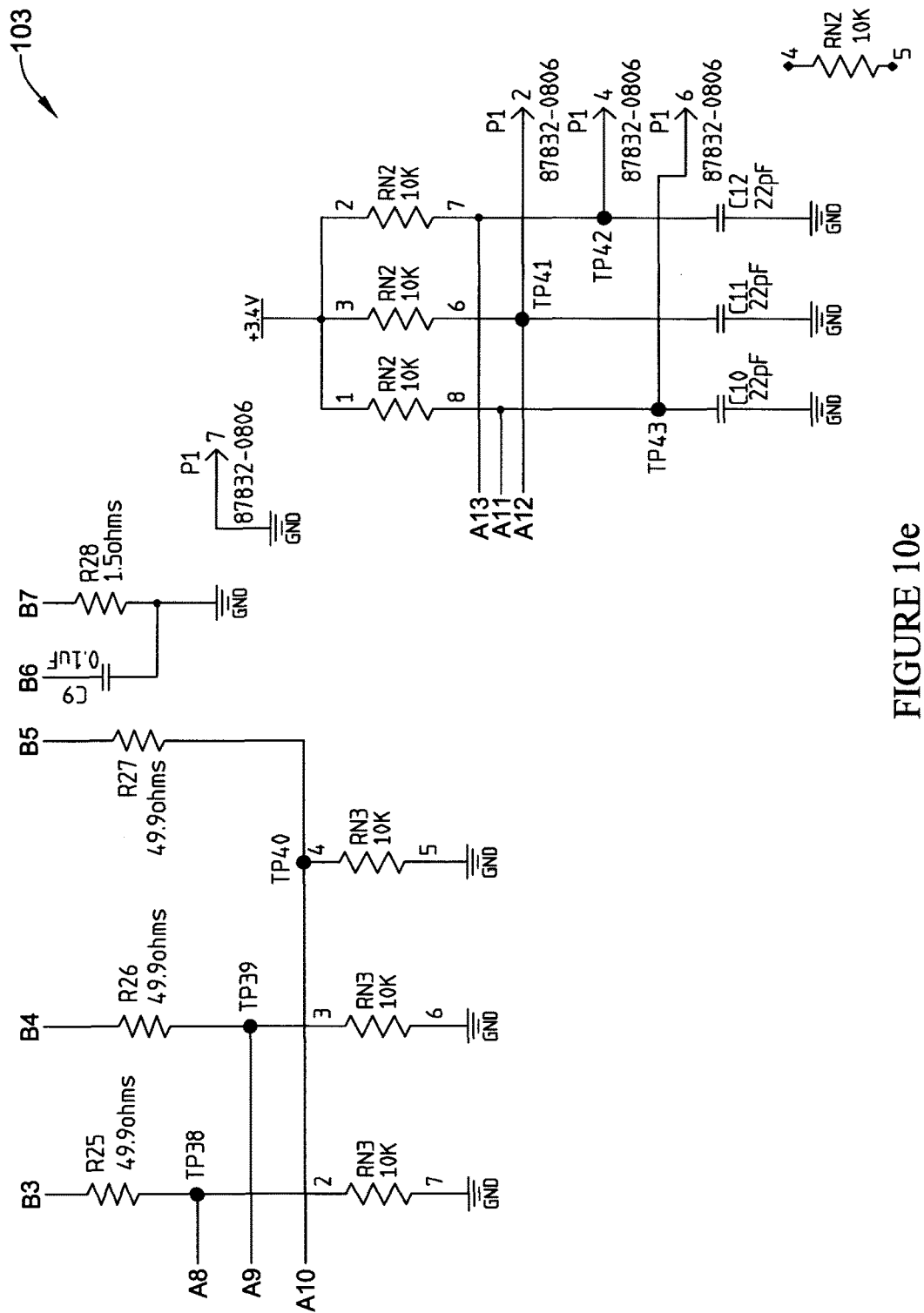
Figure 10F:
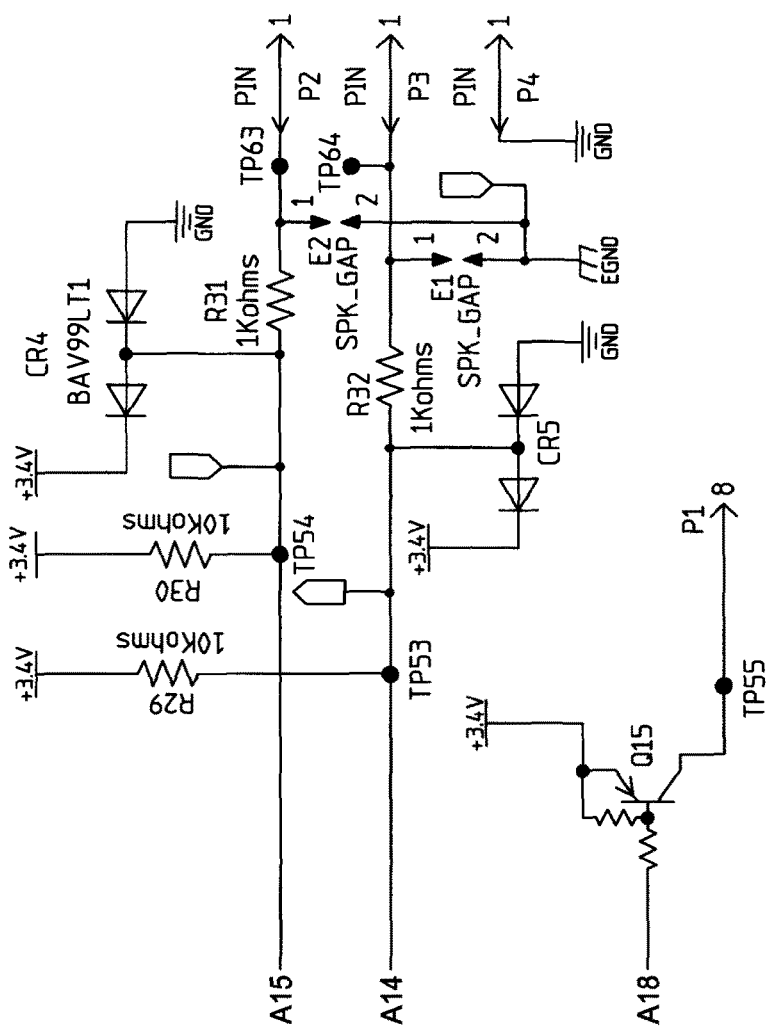
Figure 10G:
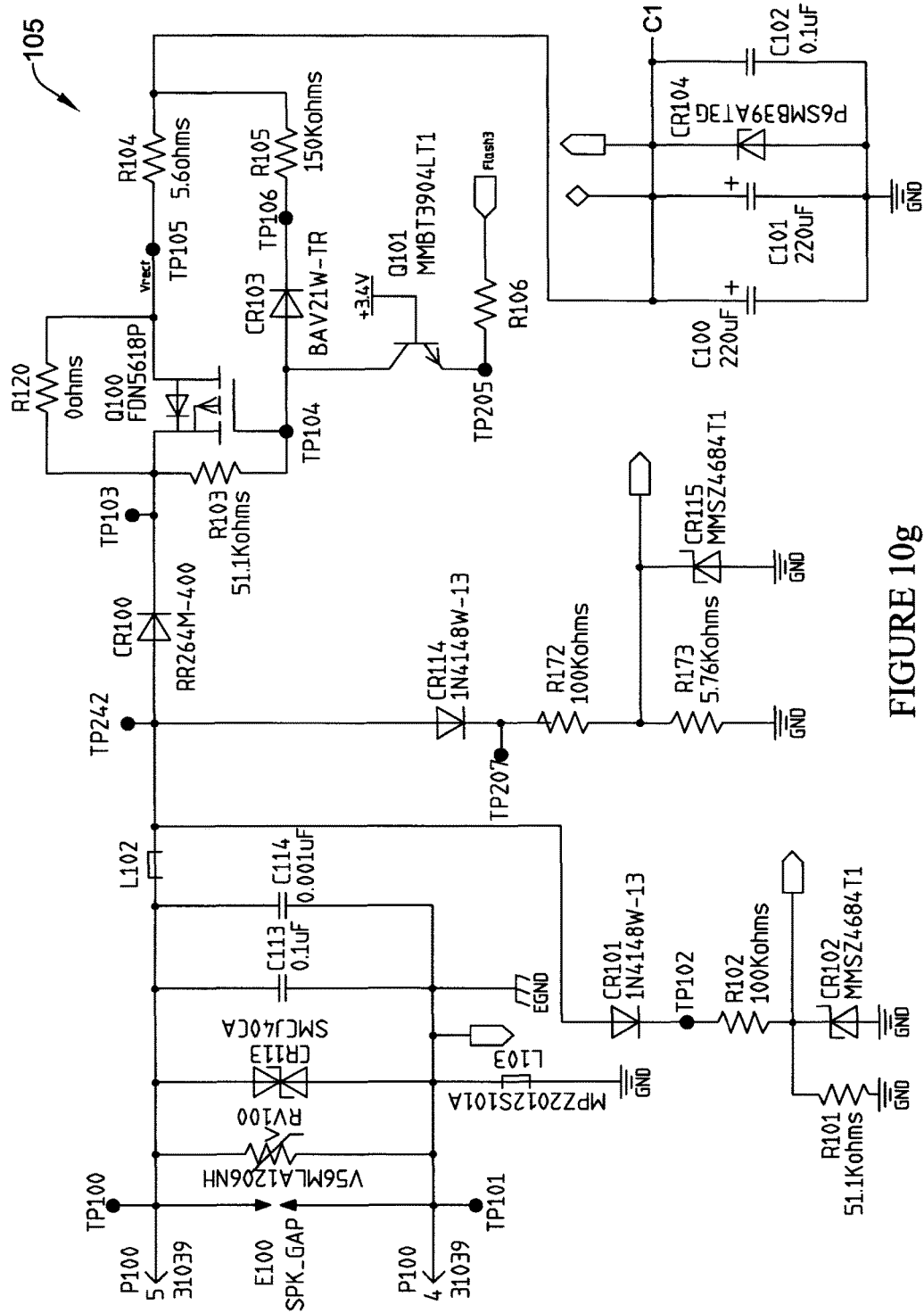
Figure 10H:
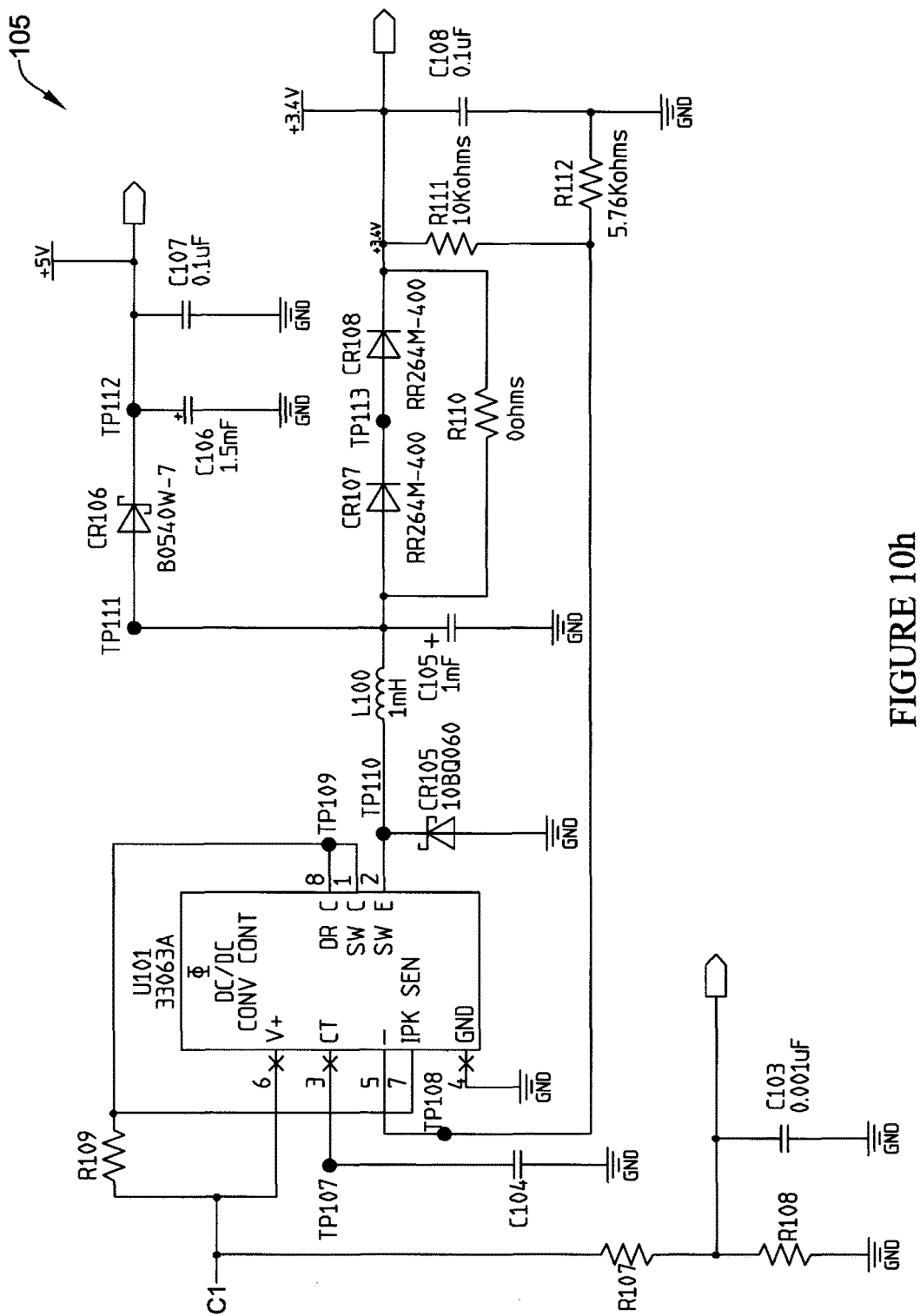
Figure 10I:
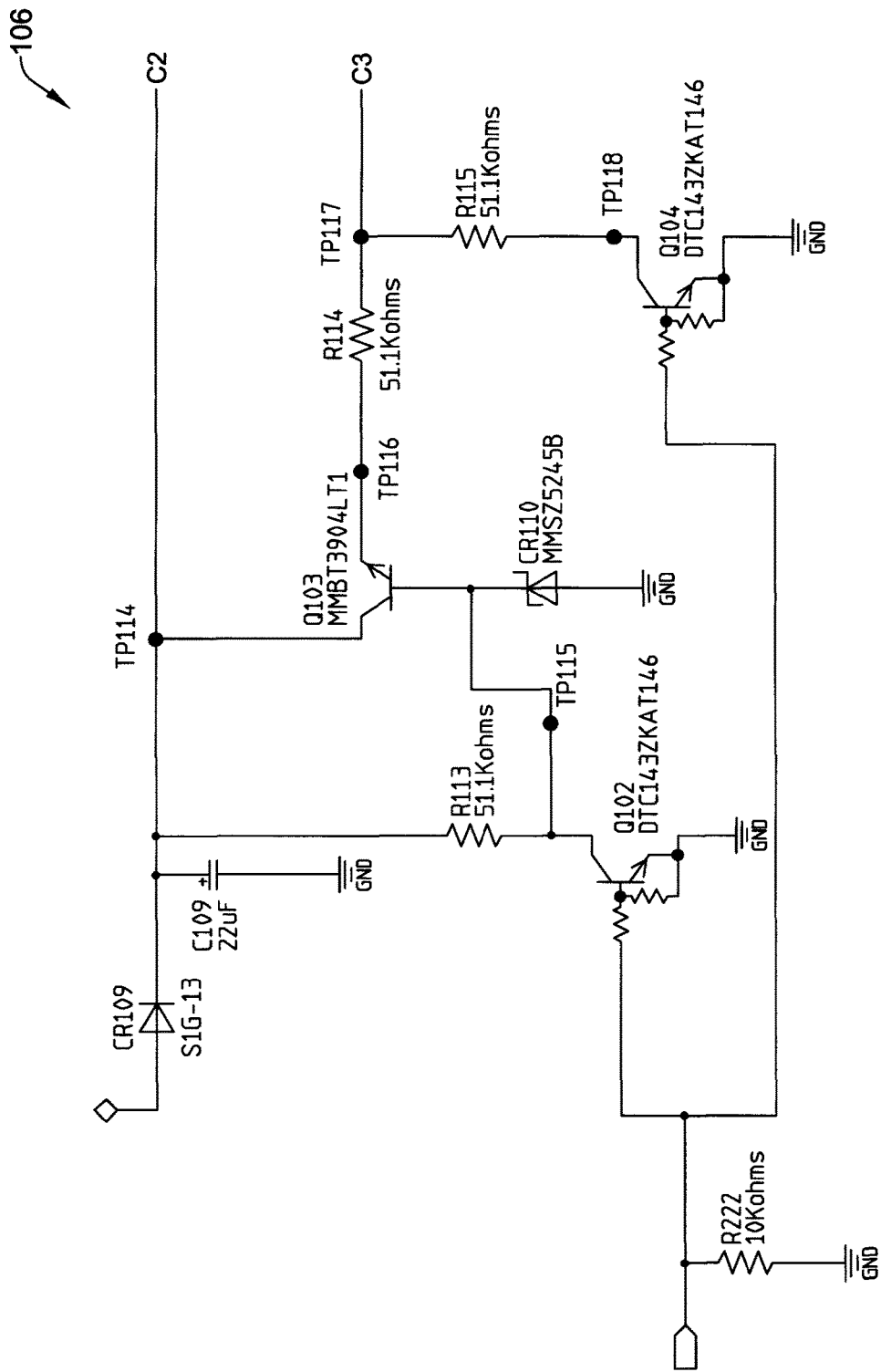
Figure 10J:
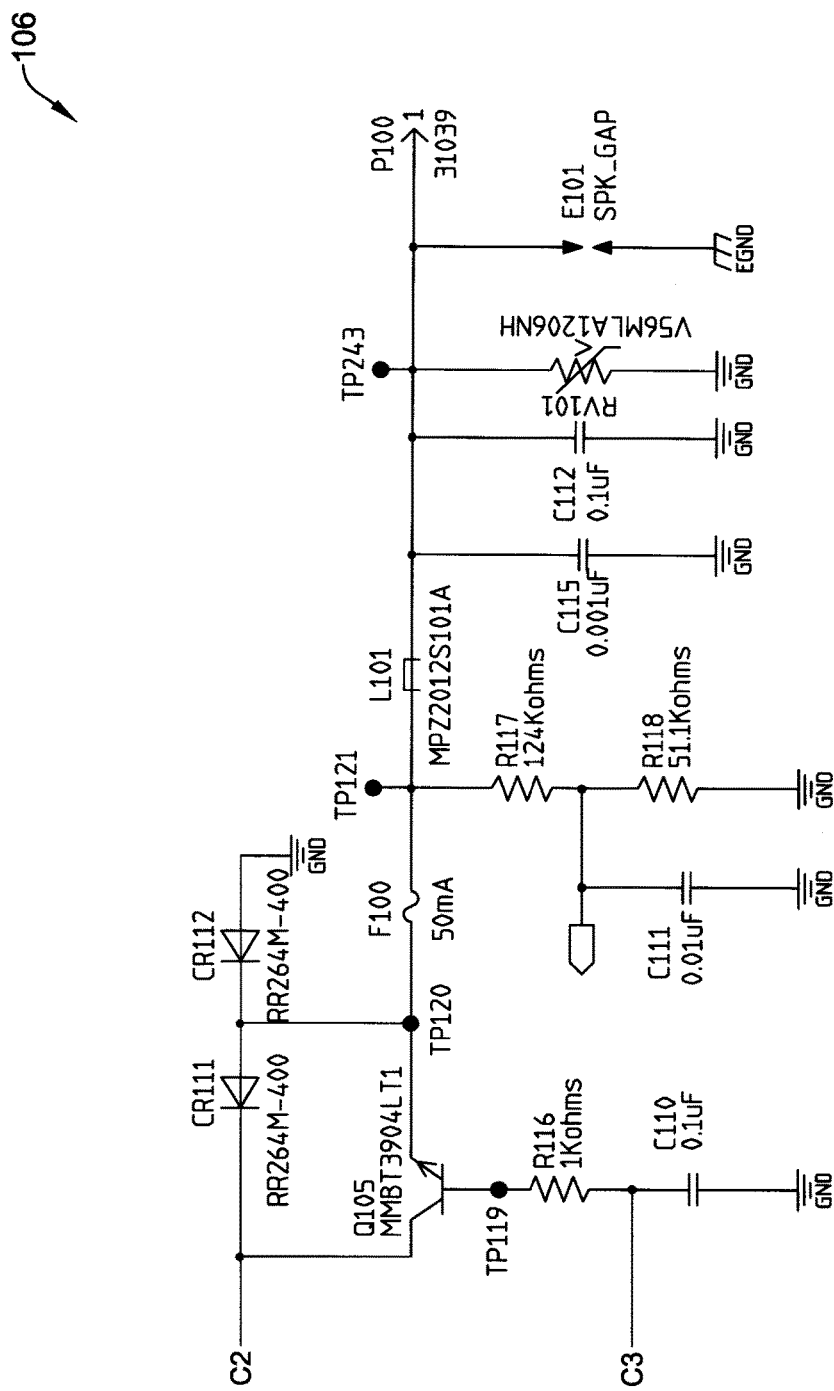
Figure 10K:
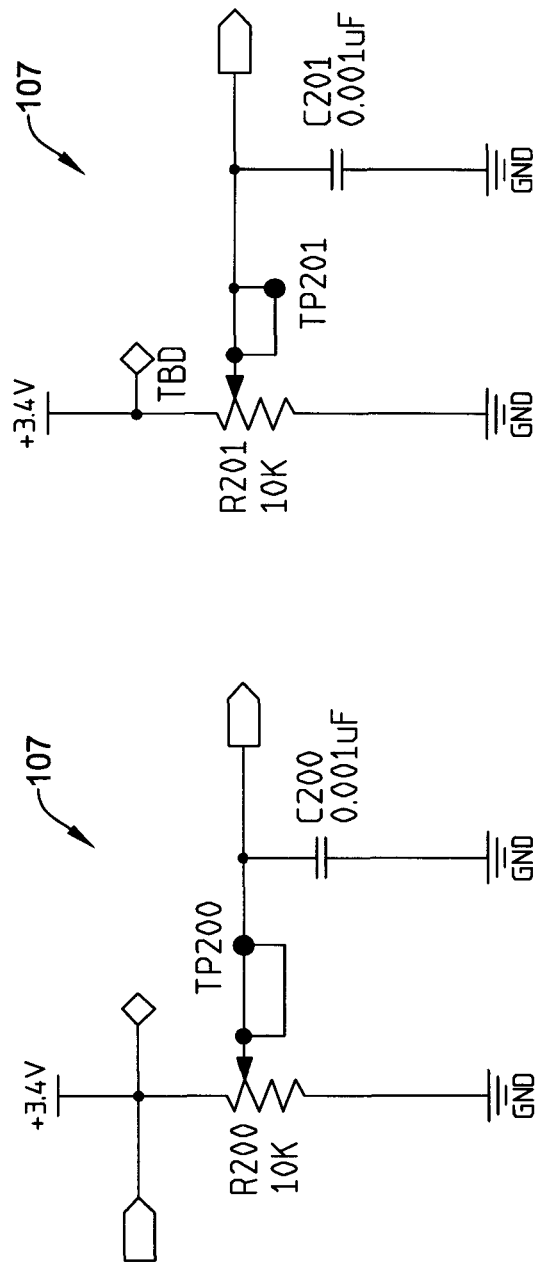
Figure 10I:
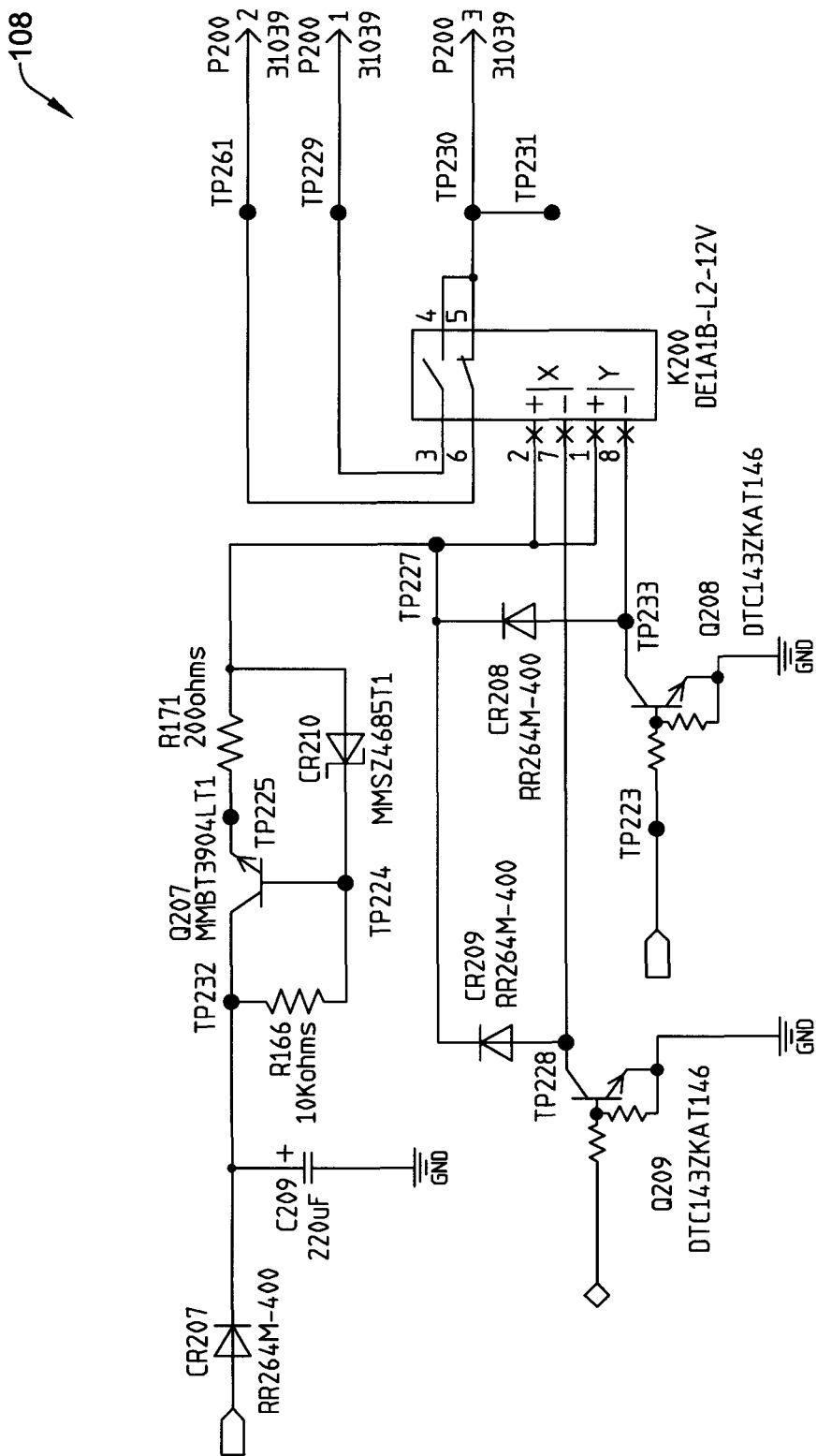
Figure 10M:
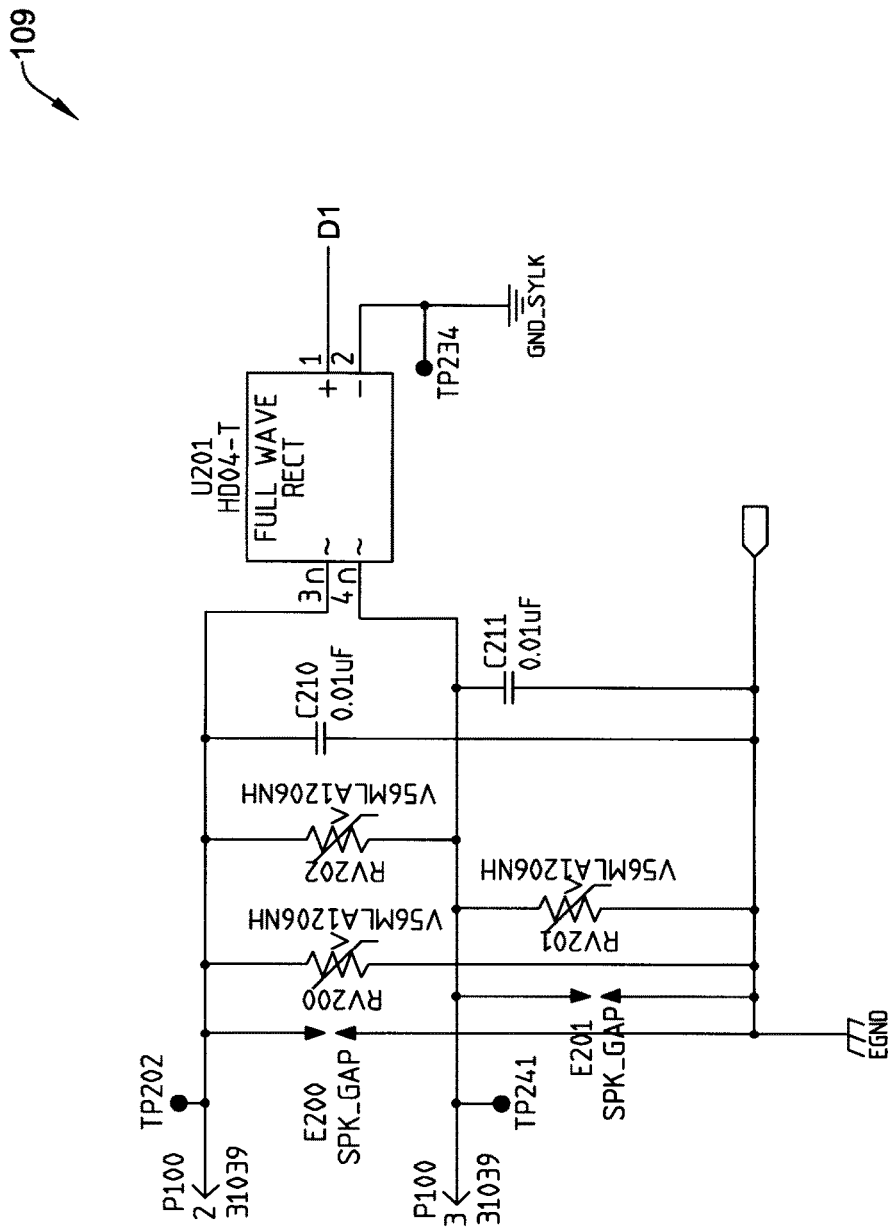
Figure 10N:
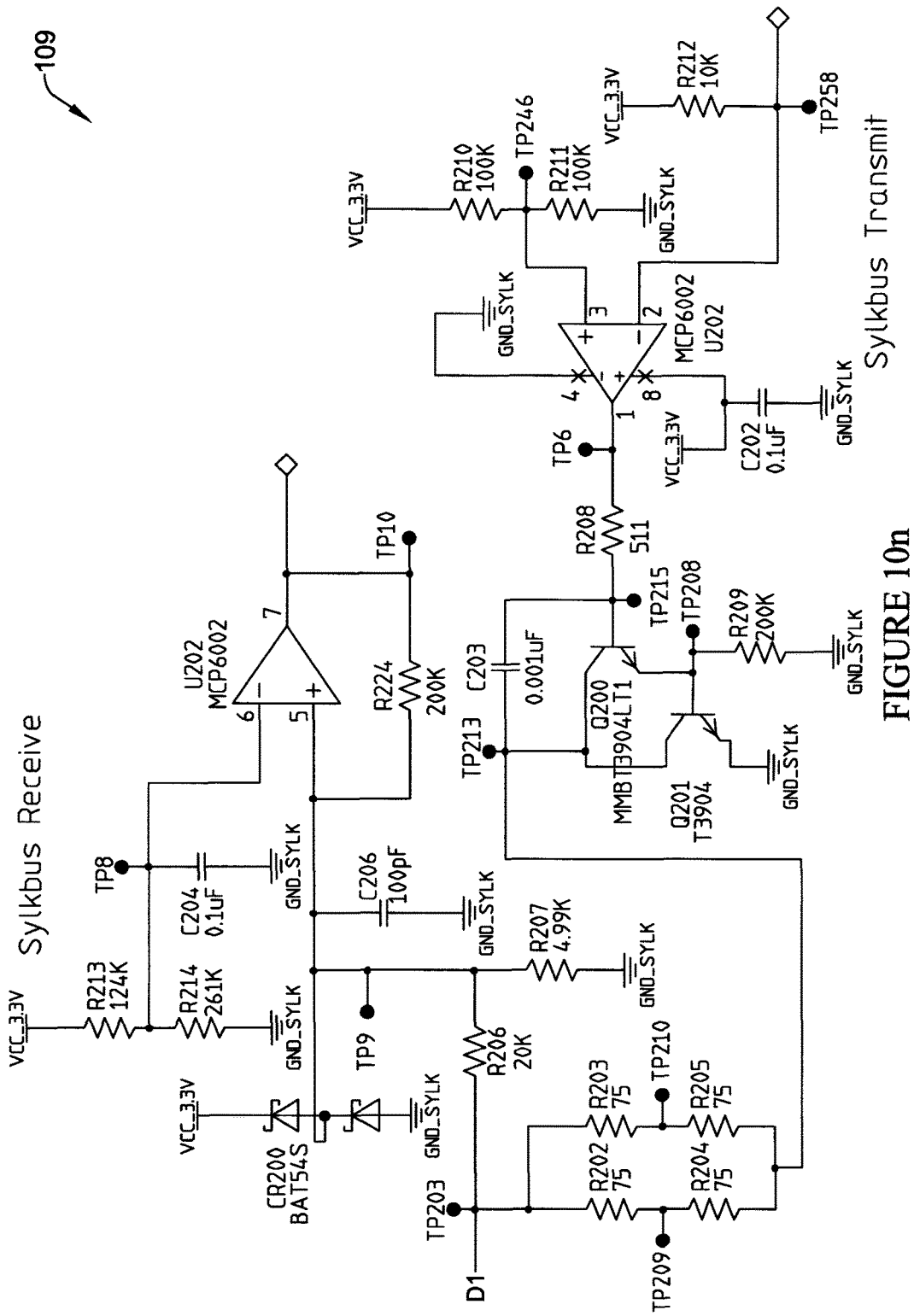
Figure 10O:
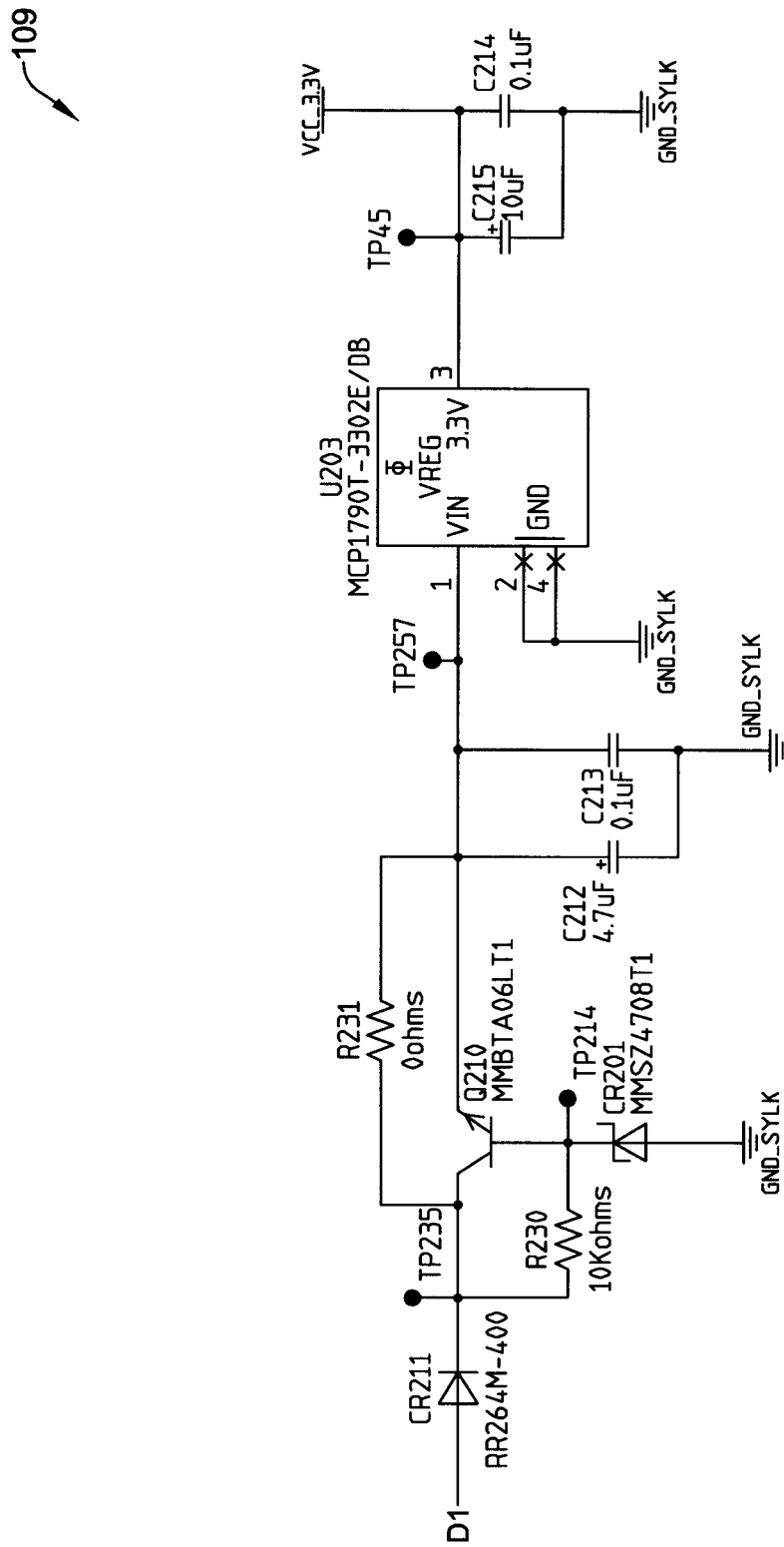
Figure 10P:
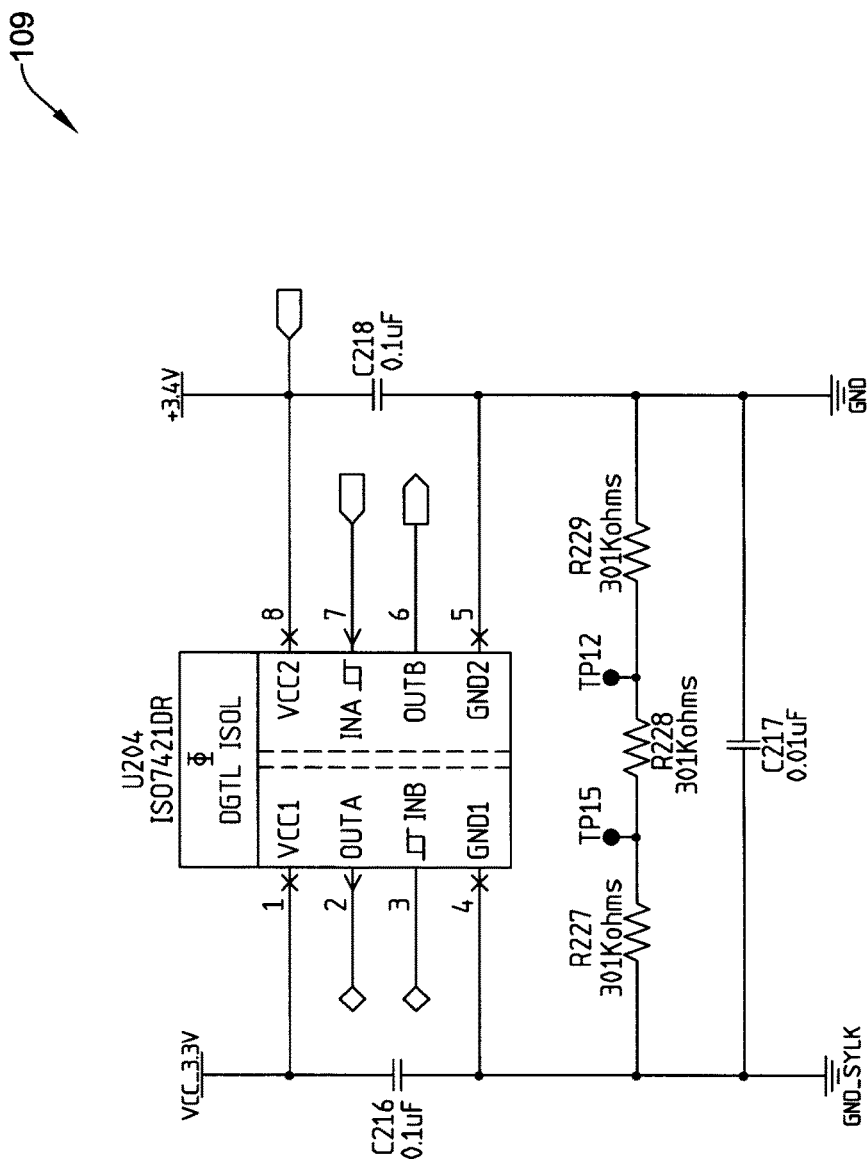
Figure 10Q:
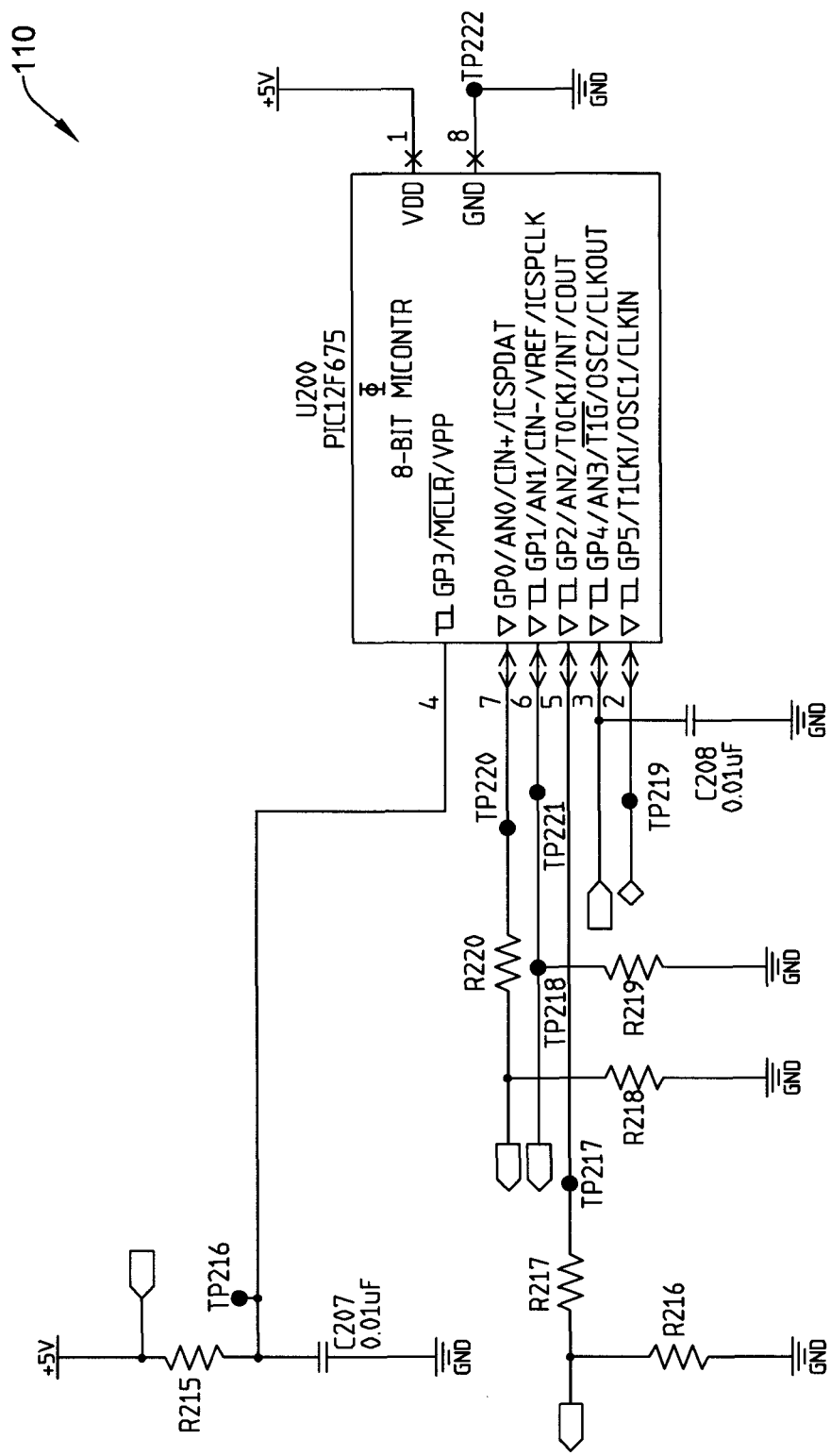
Figure 10R:
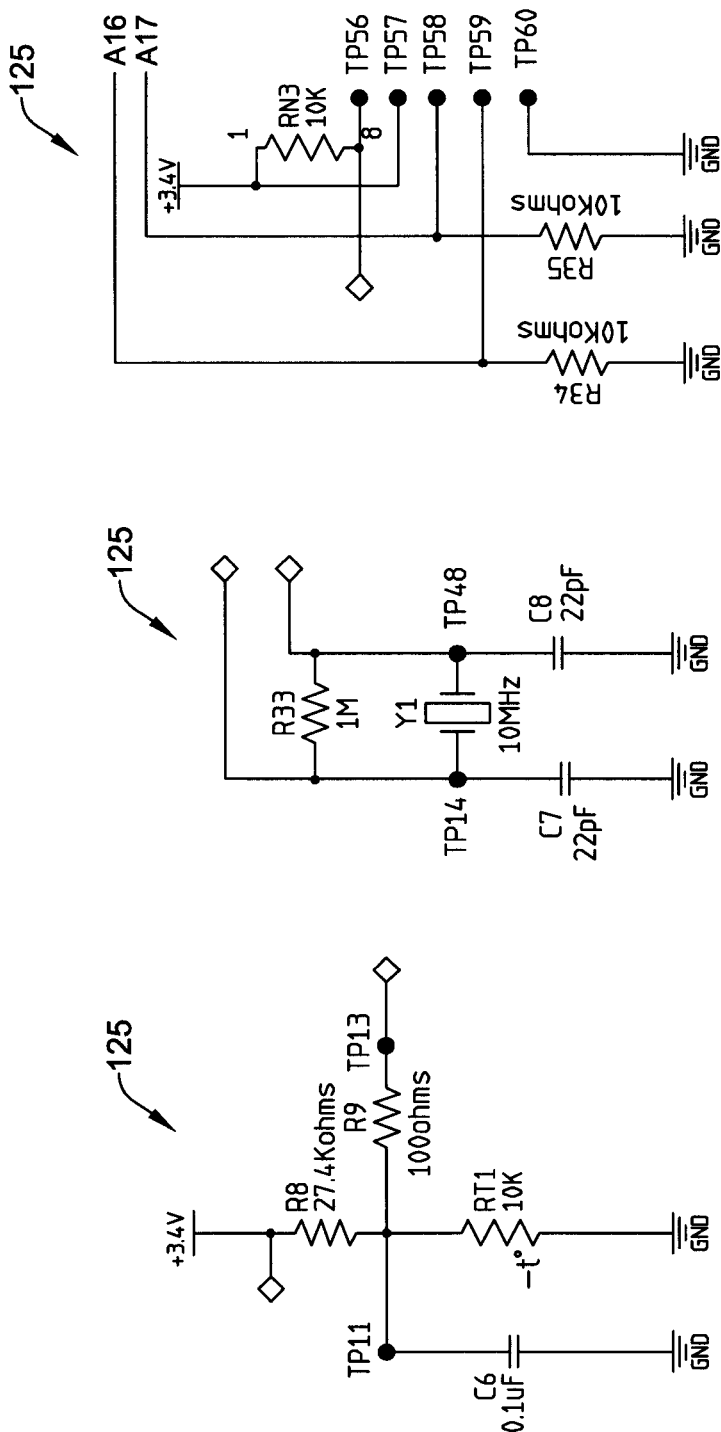

Processor 101 may be shown in a diagram of FIG. 10a. Shaft position indicator 102 may be shown in a diagram of FIG. 10b. Motor control 103 may be shown in diagrams of FIGS. 10c, 10d and 10e. Functional test electronics may be shown in a diagram of FIG. 10f. Power supply electronics may be shown in diagrams of FIGS. 10g and 10h. Analog out electronics 106 may be shown in diagrams of FIGS. 10i and 10j. User address and auxiliary switch circuitry 107 may be shown in diagrams of FIG. 10k. Auxiliary switch circuitry 108 may be shown in a diagram of FIG. 10l. Communications bus electronics 109 may be shown in diagrams of FIGS. 10m, 10n, 10o and 10p. Auxiliary switch and position potentiometer circuitry 110 may be shown in a diagram of FIG. 10q. Miscellaneous circuitry 125, such as thermistor, oscillator and flash electronics may be in diagrams of FIG. 10r. Some of the other Figures noted herein may show diagrams of other portions of circuitry helpful in building the actuator system.

The following is a recap of the present actuator system. An actuator system for use with heating, ventilating and air conditioning (HVAC) equipment, may incorporate a motor, a motor controller connected to the motor, a processor connected to the motor controller, and a switch connected to the processor for engaging the motor to open and close an HVAC actuator shaft. The switch may have a position which is a test mode. Selecting the position of test mode may cause the motor to move the actuator shaft to a certain position to verify operation of the actuator shaft. The actuator shaft may stay in the certain position while the switch is in a position of test mode. The certain position of the actuator shaft may be a fully open position. If power fails to the motor, then the actuator shaft may return to a fail safe position. The actuator shaft may be coupled to a mechanism selected from a group consisting of a damper, a valve, ventilator flap and a louver.

The system may further incorporate a communications bus connected to the processor. The test mode may alternatively be selected at a controller via the communications bus to the processor. The communications bus may have two polarity-insensitive wires.

An actuator system for use with heating, ventilating and air conditioning equipment, may incorporate an HVAC actuator. The actuator may have a motor, a gear train connected to the motor, a processor connected to the motor, an actuator shaft coupling connected the gear train, a shaft position sensor connected to the actuator shaft coupling and the processor, and a mode selector connected to the processor. Selecting a test mode on the mode selector may result in the actuator shaft coupling moving to a test mode position. The actuator shaft coupling may be attached to a mechanism selected from a group consisting of a damper, a valve, a ventilation flap and a louver.

The processor may incorporate actuator software to verify selecting the test mode on the mode selector. The actuator software may exercise an algorithm. The algorithm may state, if in test mode then set actuator to maximum allowable speed, cause actuator to open by moving to an end of an allowable span, and remain in this position while in test mode.

The mode selector may be part of a potentiometer incorporating addresses for the actuator. The actuator system may further incorporate a housing enclosing the actuator. The mode selector may be accessible on at least two places of the housing for selecting the test mode.

An approach for verifying that a heating, ventilating and air conditioning actuator has been installed correctly, may incorporate installing a mode selector on an HVAC actuator, connecting the mode selector to a processor of the actuator, and verifying that the actuator has been installed correctly by turning the mode selector to test mode to move the actuator to an end of an allowable span of the actuator within a predetermined time.

The actuator may return to a fail safe position upon a failure of electrical power to the actuator.

The processor may incorporate actuator software to verify that the mode selector has been turned to a test mode. The actuator software may then exercise an algorithm. The algorithm may state, if test mode then set actuator speed to maximum allowable speed, cause actuator to open by moving to an end of its allowable span, and remain in this position while in test mode.

The mode selector may incorporate a potentiometer having a plurality of mode selections. The potentiometer may be connected to the processor. The actuator may be enclosed within a housing. The mode selector may be accessible on at least two places of the housing.

The approach may further incorporate connecting the processor of the actuator to a remote controller via a communications bus, and alternatively selecting the test mode for the actuator at the controller. This communications bus may consist of two polarity-insensitive wires.

In the present specification, some of the matter may be of a hypothetical or prophetic nature although stated in another manner or tense.

Although the present system and/or approach has been described with respect to at least one illustrative example, many variations and modifications will become apparent to those skilled in the art upon reading the specification. It is therefore the intention that the appended claims be interpreted as broadly as possible in view of the related art to include all such variations and modifications.

What is claimed is:

1. An actuator system for use with heating, ventilating and air conditioning (HVAC) equipment, comprising:
    a motor;
    a motor controller connected to the motor;
    a processor connected to the motor controller; and
    a switch connected to the processor for engaging the motor to move an HVAC actuator shaft in a first direction to move an HVAC component during a normal application mode; and
    wherein:
    the switch has a position which is a test mode; and
    selecting the position of test mode after installation of the actuator in an HVAC system causes the motor to move the actuator shaft in the first direction to a fully open position to verify operation of the actuator shaft, wherein the actuator shaft stays in the fully open position while the switch is in a position of test mode.

2. The system of claim 1, wherein if power fails to the motor, then the actuator shaft returns to a fail safe position.

3. The system of claim 1, wherein the HVAC component is selected from a group consisting of a damper, a valve, ventilator flap and a louver.

4. The system of claim 1, further comprising:
    a communications bus connected to the processor; and
    wherein the test mode alternatively is selected at a controller via the communications bus to the processor.

5. The system of claim 4, wherein the communications bus comprises two polarity-insensitive wires.

6. An actuator system for use with heating, ventilating and air conditioning (HVAC) equipment, comprising:
    an HVAC actuator; and
    wherein the actuator comprises:
        a motor;
        a gear train connected to the motor;
        a processor connected to the motor, the processor comprising actuator software;
        an actuator shaft coupling connected the gear train, wherein the actuator shaft coupling is configured to move in a first direction to move an HVAC component during a normal application mode;
        a shaft position sensor connected to the actuator shaft coupling and the processor; and
        a mode selector connected to the processor;
        wherein selecting a test mode on the mode selector after installation of the actuator in an HVAC system results in the actuator shaft coupling moving in the first direction to a test mode position, wherein the test mode position is a fully open position; and
        wherein the actuator software verifies selecting the test mode on the mode selector, the actuator software exercises an algorithm, and the algorithm states:
        IF Test Mode THEN
            Set actuator to maximum allowable speed
            Cause actuator to fully open by moving to an end of an allowable span
            Remain in this position while in Test Mode.

7. The actuator system of claim 6, wherein the mode selector is part of a potentiometer comprising addresses for the actuator.

8. The actuator system of claim 7, further comprising:
    a housing enclosing the actuator; and
    wherein the mode selector is accessible on at least two places of the housing for selecting the test mode.

9. The actuator system of claim 6, wherein the HVAC component is selected from a group consisting of a damper, a valve, a ventilation flap and a louver.

10. A method for verifying that a heating, ventilating and air conditioning (HVAC) actuator has been installed correctly, comprising:
    installing the actuator in an HVAC system;
    installing a mode selector on an HVAC actuator, the mode selector having a test mode, wherein the actuator is configured to move in a first direction to move an HVAC component to a fully open position during a normal application mode;
    connecting the mode selector to a processor of the actuator, the processor comprising actuator software to verify that the mode selector has been turned to the test mode; and
    verifying that the actuator has been installed correctly by turning the mode selector to test mode thereby moving the actuator in the first direction to the fully open position at an end of an allowable span of the actuator within a predetermined time, wherein after turning the mode selector to test mode, the actuator software then exercises an algorithm as follows:
    IF Test Mode THEN
        Set actuator speed to maximum allowable speed
        Cause actuator to fully open by moving to an end of its allowable span
        Remain in this position while in Test Mode.

11. The method of claim 10, wherein:
the mode selector comprises a potentiometer having a plurality of mode selections; and
the potentiometer is connected to the processor.

12. The method of claim 10, wherein:
the actuator is enclosed within a housing; and
the mode selector is accessible on at least two places of the housing.

13. The method of claim 10, further comprising:
connecting the processor of the actuator to a remote controller via a communications bus; and
alternatively selecting the test mode for the actuator at the controller.

14. The method of claim 13, wherein the communications bus comprises two polarity-insensitive wires.

15. The method of claim 10, wherein the actuator returns to a fail safe position upon a failure of electrical power to the actuator.

* * * * *